United States Patent
Anand et al.

(10) Patent No.: US 8,984,480 B2
(45) Date of Patent: Mar. 17, 2015

(54) AUTOMATING AND/OR RECOMMENDING DATA SHARING COORDINATION AMONG APPLICATIONS IN MOBILE DEVICES

(75) Inventors: Rangachari Anand, Teaneck, NJ (US); Stacy F. Hobson, Poughkeepsie, NY (US); Juhnyoung Lee, Yorktown Heights, NY (US); Yuan Wang, Liaoning (CN); Jing Min Xu, Beijing (CN); Jeaha Yang, Stamford, CT (US)

(73) Assignee: International Business Machines Corporation, Armonk, NY (US)

(*) Notice: Subject to any disclaimer, the term of this patent is extended or adjusted under 35 U.S.C. 154(b) by 206 days.

(21) Appl. No.: 13/545,330

(22) Filed: Jul. 10, 2012

(65) Prior Publication Data

US 2014/0020043 A1 Jan. 16, 2014

(51) Int. Cl.
*G06F 9/44* (2006.01)
*G06F 9/54* (2006.01)

(52) U.S. Cl.
CPC ...................................... *G06F 9/544* (2013.01)
USPC ............ 717/120; 717/107; 717/108; 717/116

(58) Field of Classification Search
None
See application file for complete search history.

(56) References Cited

U.S. PATENT DOCUMENTS

| | | |
|---|---|---|
| 5,631,907 A | 5/1997 | Guarneri et al. |
| 6,009,525 A | 12/1999 | Horstmann |
| 6,134,593 A | 10/2000 | Alexander et al. |
| 6,167,568 A | 12/2000 | Gandel et al. |
| 6,385,596 B1 | 5/2002 | Wiser et al. |
| 6,449,308 B1 | 9/2002 | Knight, Jr. et al. |
| 6,463,466 B1 * | 10/2002 | Weyer .......................... 709/217 |
| 6,564,325 B1 | 5/2003 | Travostino et al. |
| 7,054,834 B2 * | 5/2006 | Hatakeyama .............. 705/26.62 |
| 7,260,598 B1 | 8/2007 | Liskov et al. |
| 8,434,157 B1 | 4/2013 | Wang et al. |
| 2001/0023412 A1 | 9/2001 | Morimoto |
| 2002/0073312 A1 | 6/2002 | Adiano et al. |
| 2003/0126275 A1 | 7/2003 | Mungavan et al. |
| 2005/0027616 A1 | 2/2005 | Jones et al. |
| 2005/0027846 A1 | 2/2005 | Wolfe et al. |
| 2005/0097567 A1 | 5/2005 | Monnie et al. |
| 2006/0064488 A1 | 3/2006 | Ebert |
| 2006/0195777 A1 | 8/2006 | Davis et al. |
| 2006/0282390 A1 | 12/2006 | Gupte |
| 2007/0143212 A1 | 6/2007 | Smith et al. |
| 2008/0033882 A1 | 2/2008 | Kafkarkou et al. |
| 2008/0040420 A1 | 2/2008 | Twiss et al. |
| 2008/0082551 A1 | 4/2008 | Farber et al. |
| 2008/0091658 A1 | 4/2008 | Kremen |

(Continued)

OTHER PUBLICATIONS

Ha, Sprechen Sie Google? A New Web Translator, Time Magazine, Thursday, May 6, 2010, http://www.time.com/time/magazine/article/0,9171,1987587,00.html.

(Continued)

*Primary Examiner* — Chuck Kendall
(74) *Attorney, Agent, or Firm* — Scully, Scott, Murphy & Presser, P.C.; Louis J. Percello, Esq.

(57) ABSTRACT

Coordinating data sharing among applications in mobile devices, in one aspect, may include a shared data manager application on a mobile device that manages data trade requirements automatically of a plurality of mobile applications, and permission grants or denials to reads and writes of data managed by the shared data manager and used by the plurality of mobile applications.

22 Claims, 19 Drawing Sheets

(56) References Cited

U.S. PATENT DOCUMENTS

| | | |
|---|---|---|
| 2008/0097921 A1 | 4/2008 | Kim et al. |
| 2008/0228869 A1 | 9/2008 | Kraft et al. |
| 2008/0275784 A1 | 11/2008 | Kramer et al. |
| 2009/0031367 A1 | 1/2009 | Sue |
| 2009/0055547 A1 | 2/2009 | Hudson et al. |
| 2009/0157899 A1 | 6/2009 | Gagliardi et al. |
| 2009/0276332 A1 | 11/2009 | Gharabally et al. |
| 2009/0276333 A1 | 11/2009 | Cortes et al. |
| 2009/0307105 A1 | 12/2009 | Lemay et al. |
| 2010/0235430 A1 | 9/2010 | Kim |
| 2010/0250946 A1 | 9/2010 | Korte et al. |
| 2010/0281475 A1 | 11/2010 | Jain et al. |
| 2010/0299219 A1 | 11/2010 | Cortes et al. |
| 2011/0010759 A1 | 1/2011 | Adler |
| 2011/0055355 A1 | 3/2011 | Lee et al. |
| 2011/0106916 A1 | 5/2011 | Cho et al. |
| 2011/0161461 A1 | 6/2011 | Niven-Jenkins et al. |
| 2012/0084791 A1 | 4/2012 | Benedek et al. |
| 2012/0110174 A1 | 5/2012 | Wootton et al. |
| 2012/0117504 A1 | 5/2012 | Lemay et al. |
| 2012/0291102 A1 | 11/2012 | Cohen |
| 2012/0317609 A1 | 12/2012 | Carrara et al. |
| 2013/0052992 A1 | 2/2013 | Lee et al. |

OTHER PUBLICATIONS

Enck, W., et al., "On Lightweight Mobile Phone Application Certification", CCS '09, Nov. 9-13, 2009, 11 pages, Chicago, IL.

Singapati, S., "Inter Process Communication in Android", Master of Science Thesis, Approved by the Faculty of Computing and Electrical Engineering on Mar. 7, 2012, Tampere University of Technology, pp. 1-52.

Chin, E., et al., "Analyzing Inter-Application Communication in Android", MobiSys '11, Jun. 28-Jul. 1, 2011, 14 pages, Bethesda, MD.

\* cited by examiner

AUTOMATING AND/OR RECOMMENDING DATA SHARING COORDINATION AMONG APPLICATIONS IN MOBILE DEVICES

FIELD

The present application relates generally to computers, and computer applications, and more particularly to mobile devices such as smart phones, mobile networking and mobile applications.

BACKGROUND

Existing mobile device applications or apps, for instance, applications for smartphones, are restricted in their capability to communicate with other applications on the same mobile device because they run in a sandbox paradigm. For example, for security reasons, a mobile device's operating system (OS) may restrict each application (including its preferences and data) to a unique location in the file system. This restriction is part of the security feature known as the application's sandbox. The sandbox is a set of fine-grained controls limiting an application's access to files, preferences, network resources, hardware, and so on. Each application has access to the contents of its own sandbox but cannot access other applications' sandboxes.

In another known mobile device, the kernel sandboxes applications from each other, and therefore, applications must explicitly share resources and data. They do this by declaring the permissions they need for additional capabilities not provided by the basic sandbox. Applications statically declare the permissions they require, and the system prompts the user for consent at the time the application is installed. There is no mechanism for granting permissions dynamically (at runtime) because it complicates the user experience to the detriment of security.

The current smartphone data access model allows and application to access or read only its own private data and those carefully selected data objects maintained by the system, for example, the mobile device's operating system that may include content management functionality. Applications cannot directly communicate with each other.

BRIEF SUMMARY

A method and system for coordinating data sharing among applications in a mobile device may be provided. The method in one aspect, may include constructing a data trade dependency graph based at least on one or more mobile applications existing on the mobile device and data trade information associated with the mobile applications, the data trade dependency graph including one or more application nodes representing the one or more mobile applications respectively, and one or more data attribute nodes that represent one or more data attributes associated with the one or more mobile applications. The method may also include determining a best-matching candidate application to deploy to the mobile device from a set of candidate applications based on the data trade dependency graph. The method may further include determining data conflict information for all of the candidate applications based on the data trade dependency graph. The method may yet further include determining newly enabled and added function information for all candidate applications. The method may still yet include determining data gap information for all candidate applications. The method may further include presenting the best-matching candidate application and data sharing analysis information gathered from the determined data conflict information, the determined newly enabled and added function information, and the determined data gap information.

In another aspect, a method of coordinating data sharing among applications in a mobile device, may include constructing a data trade dependency graph based at least on one or more mobile applications existing on the mobile device and data trade information associated with the mobile applications, the data trade dependency graph including one or more application nodes representing the one or more mobile applications respectively, and one or more data attribute nodes that represent one or more data attributes associated with the one or more mobile applications. The method may also include selecting a candidate data trade that is un-granted from the data trade dependency graph. The method may further include selecting an optimization rule to apply. The method may yet further include evaluating whether to grant data trade to the candidate data trade based on the selected optimization rule. The method may further include computing a priority for each of the evaluated candidate data trade considered for granting. The method may further include generating a permission recommendation ranked by the priority, wherein data trade permissions are automatically determined.

A system for coordinating data sharing among applications, in one aspect, may include a mobile device having a processor. The system may also include a shared data manager module deployed on the mobile device and operable to execute on the processor. The shared data manager may include a data trade dependency graph constructor operable to construct a data trade dependency graph based at least on one or more mobile applications existing on the mobile device and data trade information associated with the mobile applications. The data trade dependency graph may include one or more application nodes representing the one or more mobile applications respectively, and one or more data attribute nodes that represent one or more data attributes associated with the one or more mobile applications. A best-match app analyzer may be operable to determine a best-matching candidate application to deploy to the mobile device from a set of candidate applications based on the data trade dependency graph. A data conflict analyzer may be operable to determine data conflict information for all of the candidate applications based on the data trade dependency graph. A new enabled and added function detector may be operable to determine newly enabled and added function information for all candidate applications. A data gap analyzer may be operable to determine data gap information for all candidate applications. An app recommender may be operable to invoke the best-match app analyzer, the data conflict analyzer, the new enabled and added function detector, and the data gap analyzer. The app recommender may be further operable to present the best-matching candidate application and data sharing analysis information gathered from the determined data conflict information, the determined newly enabled and added function information, and the determined data gap information.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A controlled mechanism is provided for applications (also referred to as apps) on smart mobile devices to communicate with each other. In one aspect, mobile users are enabled to coordinate access to data shared among different applications. In another aspect, instead of each application being self-contained, an application may only need to provide a part of the overall desired functionality, which provides customizability and flexibility for the mobile users.

Figure 1:
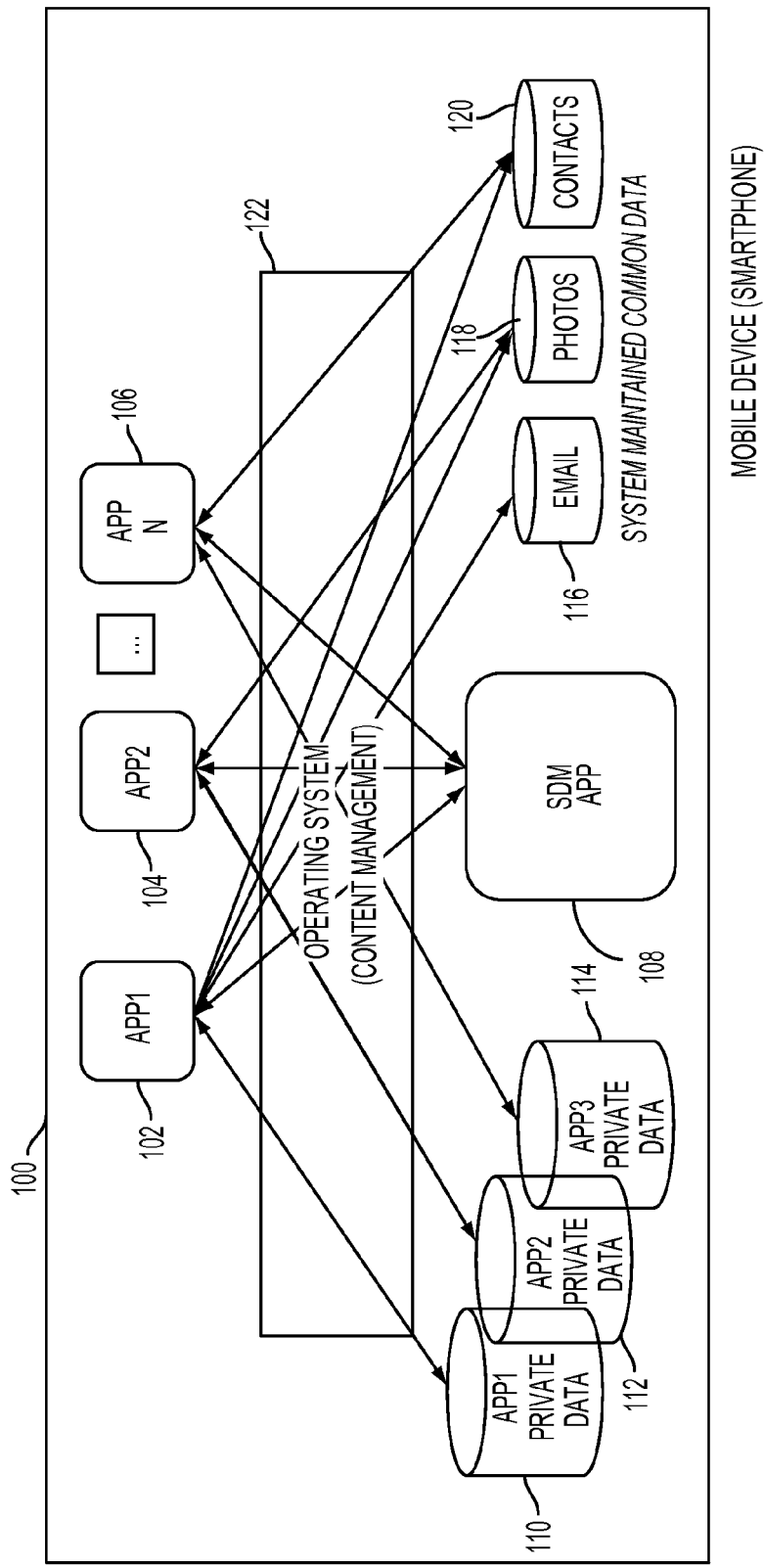
FIG. 1 is a diagram illustrating components of the present disclosure which may be deployed on a mobile device for enabling sharing of data among applications on the mobile device in one embodiment of the present disclosure.

FIG. 1 is a diagram illustrating components of the present disclosure which may be deployed on a mobile device for enabling sharing of data among applications on the mobile device in one embodiment of the present disclosure. A mobile device 100 may include a plurality of applications 102, 104, 106, each having its own data or database 110, 112, 114 respectively, for performing its functions. An operating system 122 provides system functionalities for the mobile device 100. The mobile device 100 may also include system maintained common data associated with functionalities such as email 116, camera/photo 118, contacts 120, and others. Usually, while system maintained common data, e.g., 116, 118, 120, may be accessible to the applications 102, 104, 106, an application may not access data maintained by another application. In the system and methodology of the present disclosure, applications 102, 104, 106 are enabled with a controlled way of communicating with each other via a shared data manager (SDM) 108. In one embodiment of the present disclosure, instead of each application being self-contained, an application only needs to provide a part of the overall desired functionality, which allows for much more customizability for users. The SDM 108 may be implemented as an application that can be downloaded from an electronic application store or the like (such as an app store), and configured to work with other applications in the device 100. An editor or like functionality, referred to herein as a shared data editor (SDE) can be used to specify permissions for data sharing among applications.

The SDM 108 allows the applications 102, 104, 106 deployed or running on mobile devices to share their data 110, 112, 114 with one another. For example, each mobile application (e.g., 102, 104, 106) may have its own data or database (110, 112, 114, respectively) for use in performing its functionality. In the present application in one embodiment, those applications 102, 104, 106 may access (read and/or write) the data of another application (e.g., 110, 112, 114) via the SDM 108. The data sharing mechanism among mobile applications of the present disclosure may be used in vertical markets, for example, in the field of medicine, real estate, public safety, building/facilities maintenance, and others. Platform vendors or the like parties may provide the platform where applications will work together by using SDM. These may be generic application (app) stores that offer applications in various domains. There may be a separate app store for a different domain. For example, an app store for medicine, another one for real estate, yet another one for public safety, and others may exist. There may be one platform vendor that provides the platform services across the different app stores, while there are different platform vendors for different platforms in different app stores in different domains. Such platform vendors, e.g., may define schema, for example, for a domain, and application programmers or the like may write applications that take advantage of the data sharing mechanism via the defined schema. A different schema for each domain may be created, e.g., to keep it compact and easy to understand. For sharing data across domains, it is possible to create meta-data schema for mapping data model/schema from a domain to that in another domain.

In one embodiment of the present disclosure, the SDM data schema is open and may be shared among the application developers. When an application programmer or the like develops the applications, the programmer or the like may refer to the data schema and define the app-specific local data schema based on the SDM data schema. It is also possible that the local schema (local to the application) is not strictly based on the SDM data schema. In that case, during the app's onboarding to the SDM platform, the SDM administrator may create a mapping between the SDM data schema and app's local data schema. It is possible that there may not be a full mapping between them. The SDM in one embodiment allows apps to share whatever is mapped to the SDM data schema. In one aspect, the SDM is based on loose coupling of applications on a best effort basis. The SDM may also include an editor, referred to as a shared data editor (SDE). Given a large app store, SDE in one embodiment of the present disclosure may automatically recommend apps and their "data trades" based on needs and constraints.

Details of SDM are further described in co-owned U.S. patent application Ser. No. 13/051,303 entitled, "Shared Data Management in Software-As-A-Service Platform" and filed on Mar. 18, 2011, which application is incorporated herein by reference in its entirety. That application discloses a shared data manager (SDM) concept on Software as a Service (SaaS) cloud computing platform that enables loose coupling of SaaS applications. Applications can share data without being directly aware of each other. SDM on SaaS provides a curated data model, in which platform vendors can define object schema and write applications that access data, offering fine-grained permission control over access to shared data. Co-owned U.S. patent application Ser. No. 13/163,274 entitled, "Open Data Marketplace for Municipal Services" and filed on Jun. 17, 2011 describes data marketplace; co-owned U.S. patent application Ser. No. 13/163,177 entitled, "Dynamic Application Adaptation in Software-As-A-Service Platform" and filed on Jun. 17, 2011 describes dynamic application adaptation; co-owned U.S. patent application Ser. No. 13/163,373 entitled, "Enforcing Data Sharing Policy Through Shared Data Management" and filed on Jun. 17, 2011, describes enforcing data sharing. Those applications are incorporated herein by reference in their entirety.

Figure 2:
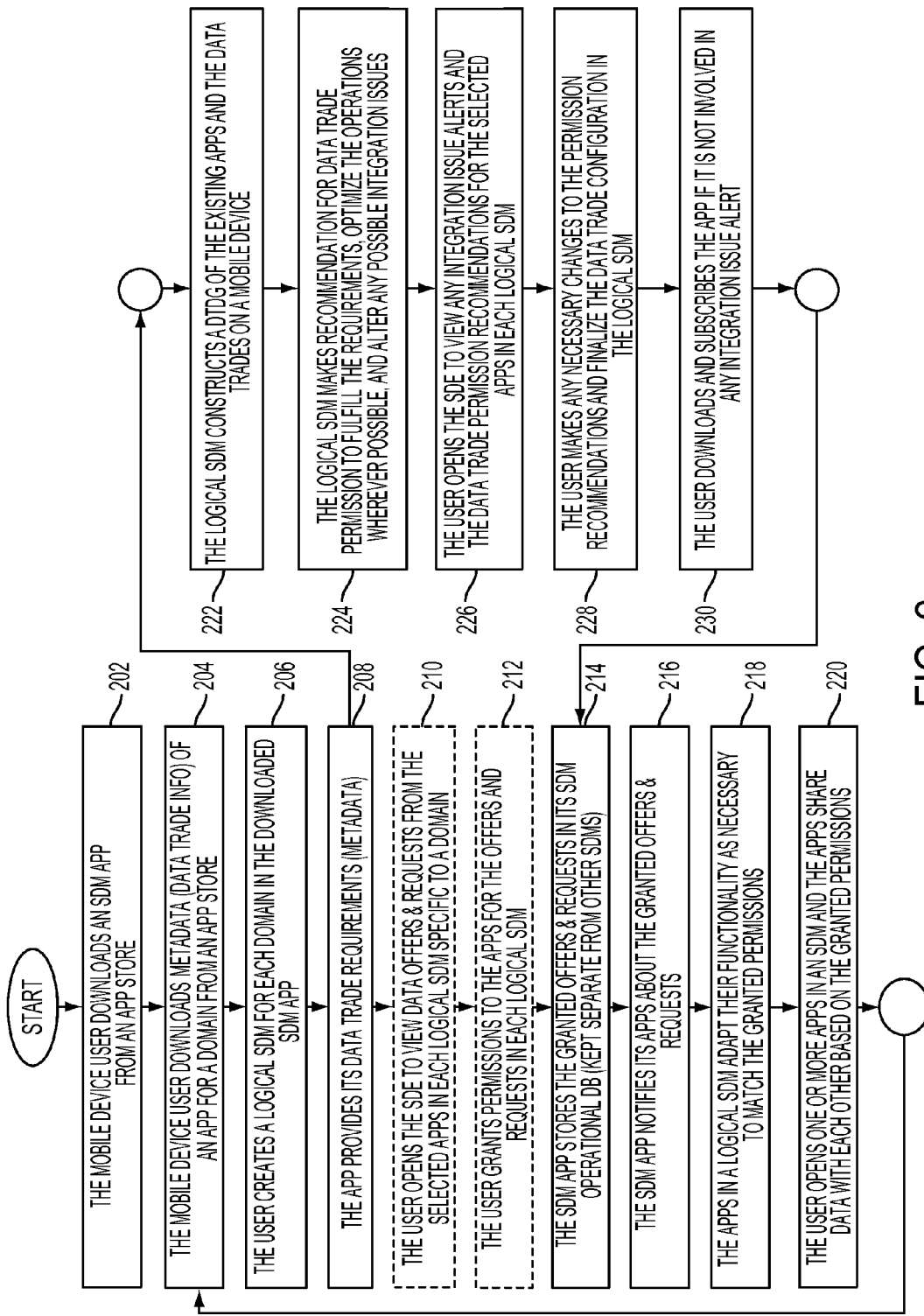
FIG. 2 is a flow diagram illustrating a method in one embodiment of the present disclosure for data sharing among applications in a mobile device.

FIG. 2 is a flow diagram illustrating a method in one embodiment of the present disclosure for data sharing among applications in a mobile device. At 202, an SDM application may be downloaded to a mobile device. For instance, a user of the mobile device may purchase the SDM application via an application store accessible on the mobile device. At 204, metatdata (also referred to as data trade information) associated with one or more applications may be downloaded to the mobile device from an electronic application (app) store. Data trade information refers to an applications specification or requirements for read and/or write accesses to data, e.g., the data that the application uses in performing its functions. The SDM collects data trades among apps in its operational database and may make this information available to the user through a tool referred to as a Shared Data Editor (SDE). This tool may be used to decide the actual permissions to be granted to applications. Applications may be sent permissions messages by the SDM whenever permissions change, for instance, which could be at any time, and dynamically.

At 206, one or more logical SDMs may be created. For instance, a logical SDM may be created for domain or field that one or more applications pertain to. Examples of domains may include but are not limited to medical, real estate, finance, and others. Thus, multiple logical SDMs may be created, for example, one per domain or field. A logical SDM is an instance of an SDM application. Thus, different instances of SDM may be created for different application domains. Each instance may have a different data schema to deal with a different set of apps in the corresponding domain. In another embodiment, there can be a single SDM app instance that supports multiple data schema, one for each domain. In both cases, there may be only a single physical object database supporting multiple logical data schema, one for each domain. Thus, there may be only a single database running in a mobile device. This physical database can support multiple logical data schema, one for each domain supporting multiple applications in the domain. In an embodiment, each data schema may contain one or more classes or the like data structure modeling one or more objects used (read/written) by the applications in the domain in one or more object databases. There may be a single SDM instance that handles multiple data schema. Also, there may be multiple SDM instances that handle one or more data schema. In one embodiment of the present disclosure, whenever a user adds a new domain to the SDM app, the SDM app creates a logical SDM. As part of the domain creation, the user may select apps for the domain. The SDM app collects data trade among the selected apps in the domain, makes the data trade information available to the user through SDE. This data trade information for a domain is the data schema for the domain. The user may further configure data sharing permission among the apps in SDE.

At 208, each downloaded application provides its data trade requirements. Data trade in the present disclosure refers to read and write of data, for instance, those which are owned and used by the application as well as other applications. In the present disclosure data write is also referred to as a data offer, data read is also referred to as a data request. Data trade requirements define which data an application would be reading and/or writing. In one embodiment of the present disclosure, when a new app is downloaded (and assigned to an SDM domain instance), the SDM app analyzes the data objects used by this download app, and maps each of the attributes to one or more attributes in the SDM data schema of the instance. If necessary, the domain's data model, i.e., object model can be extended to accommodate the objects and attributes from this new app. The result of the mapping may be shown in the SDE tool. With this view, the user can configure the sharing of the object attributes for this app in SDE.

At 210, via a shared data editor or like tool, a user is enabled to, and for example, opens the SDE to view data offers and requests from selected applications in each logical SDM, for example, specific to a domain. At 212, a user is enabled to, and for example, grants or denies permission to the selected applications for the offers and requests. The user may the owner of the mobile device.

While at 210 and 212 a user may be enabled to view and configure data trade permission, in one embodiment of the present disclosure, configuring of data trade permissions may be performed automatically. Thus, for example, at 222, a logical SDM may construct a dependency graph (referred to as a data trade dependency graph (DTDG)) of the existing apps and the data trades on a mobile device.

At 224, the logical SDM may make recommendations for data trade permission to fulfill the requirements, optimize the operations, and alter any integration issues. Detail description of this methodology is further described below.

At 226, the user is enabled to view any integration issue alerts, e.g., via the SDE, and the data trade permission recommendations for one or more apps in each logical SDM.

At 228, the user is enabled, e.g., via the SDE, to make any changes to the permission recommendations and finalize the data trade configuration in the logical SDM.

At 230, the user may download and subscribe the one or more apps that have been configured, e.g., if it is not involved in any integration issue alerts. When an application is downloaded to a mobile device and the user desires to assign the application to a domain in SDM, the application is linked to the SDM application. The SDM application becomes aware of the downloaded application, and the application is assigned to an SDM domain. The SDM application analyzes the data trade requirements of the downloaded application and reflects it to the SDE.

At 214, the SDM application may store the granted or denied offers and requests in its SDM operational database (DB), which for instance, may be kept separate from other SDMs. For instance, the SDM operational DB stores metadata that indicates which app can access which attributes in the SDM data schema in the domain. The SDM itself may contain the data (as opposed to the metadata), i.e., attribute values accessed by the apps which have permission.

At 216, the SDM application notifies its applications informing them of the granted offers and requests.

At 218, the applications adapt their functionality as necessary to match the granted permissions. In one aspect, the SDM provides a marketplace among apps where they trade data among themselves. Consider that there exists an object attribute X in an SDM domain to which app A, app B and app C are assigned. Consider also that app A and app B write to X, and app C reads X. Consider that the user sets the permission accordingly in SDE. Consider that the user sets the permission for app C to read the value of X written by app A, but not one by app B. With this setup in SDE, app C acts accordingly. It reads the value of X written by app A, but one not by app B. It may lead to different behavior of app C.

At 220, the user opens one or more applications associated with the SDM, and the applications share data with each other based on the granted permissions. For example, the user runs a first application associated with the SDM application and that application may access data that is owned or used by a second application associated with the SDM.

Figure 3:
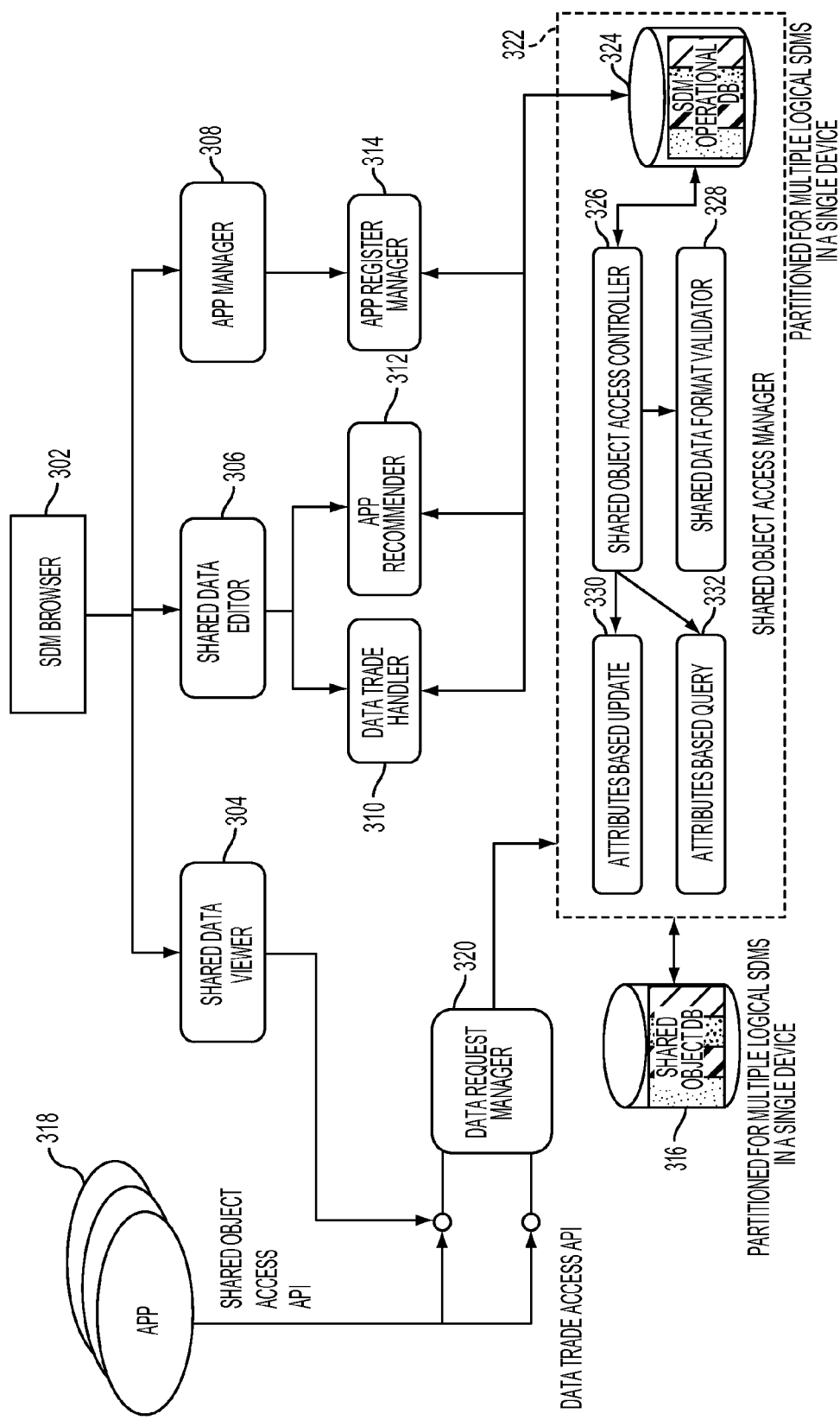
FIG. 3 is a diagram illustrating an SDM and application subscription in a mobile device in one embodiment of the present disclosure.

FIG. 3 is a diagram illustrating an SDM for application subscription in a mobile device in one embodiment of the present disclosure. The components shown are deployed on a mobile device in one embodiment of the present disclosure. In one embodiment, the architecture comprises three layers of components: The components in the first layer are the web-based tools that are used by the SDM user or the app developers. The SDM user may use a resource management tool (Resource Management Tool) or the like to create or update the schema of shared objects. Also, the tool may be used to query or modify the shared data objects. The SDM user can also use the tool to grant or reject trade requests. App developers can use a trade management tool or the like (Trade Management Tool) to submit trade requests or view the result of the trade request processing. The SDM user and app developers may use an application management tool or the like (Application Management Tool) to subscribe to or register, respectively, applications to the SDM. A Shared Data Viewer in one embodiment provides a consolidated view of the shared data to end users, for example, shows the parcel data on a geographical map (e.g., graphically by using a geographic mapping tool or system). The components in the second layer handle the calls coming from the upper level. These components implement the business logic and accessing of the operational data. The lowest level contains a shared object access manager or the like tool (Shared Object Access Manager) that acts as the endpoint of shared objects read/write operations. This component composes shared objects with the right content based on the trade permissions. Also, it validates the format of incoming and out-coming data. The components in the lowest level may be designed to be replaceable to adapt to the different storage system.

Referring to FIG. 3, an SDM browser 302 may be a user interface that provides interfaces into a shared data viewer 304, a shared data editor 306 and an application manager 308. For instance, when a user selects and runs an SDM application on a mobile device, the user may be presented with the SDM browser 302 that presents the shared data viewer 304, the shared data editor 306 and the application manager 308, from which the user may choose to run. The shared data viewer 304 in one embodiment of the present disclosure may provide a functionality that presents a consolidated view of the shared data to end users, for example, show or display the parcel data on a geographical map for domain associated with real estate.

The shared data editor 306 enables a user to grant or deny data offers and requests via a data trade handler 310. The data trade handler 310 may also automatically grant or deny data offers and requests based on analysis performed by an app recommender 312. Those components may provide the functionalities of the Trade Management Tool, via which application developers may submit trade requests or view the result of the trade request processing.

The application manager 308 is a component of the application management tool, which the SDM user and app developers may use to subscribe to or register, respectively, applications to the SDM. An application register manager 314 enables the SDM users and/or application developers to register applications to the SDM.

Applications 318 are those apps that are deployed on the mobile device. The Apps 318 may access an SDM object DB 316 and an SDM operational DB 324 by using application program interfaces (APIs). For example, a Shared Object Access API or the like may be used for accessing the SDM object DB 316 and a Data Trade Access API or the like may be used for accessing the SDM operational DB 324.

A data request manager 320 receives data requests from apps and passes them to the SDM object DB and SDM operational DB for processing.

A shared object database 316 may be at a lowest level of the system architecture and may contain a shared object access manager (Shared Object Access Manager) 322 or the like functionality that acts as the endpoint of shared objects read/write operations. This component composes shared objects with the right content based on the trade permissions. Also, it validates the format of incoming and out-going data. The components in the lowest level are designed to be replaceable to adapt to the different storage system.

Components shown at 322 may reside in local or remote device from the mobile device. For example, all the data both in SDM object DB 316 and SDM operational DB 324 can be stored locally and remotely, e.g., "on cloud" if desired or needed.

The data objects may be categorized into two groups in one embodiment of the present disclosure, an operational data 324 (Operational Data 324) and shared object 316 (Shared Objects). The Operational Data 324 is the metadata of the SDM, including the definition of applications, the shard object schema, various attributes, the data trade of an application, etc. The Shard Objects 316 present the actual data entities, for example, the data structure of a land parcel. It is noteworthy that the number of the Shared Objects and their attributes may increase in time, as more applications are added to the platform.

Shared Object Access Manager 322 works as follows in one embodiment of the present disclosure: An app 318 makes a data query call to the SDM Request Manager 320, which parses the request parameter and performs basic authentication. Then the SDM Request Manager 320 may call a query attributes based query 332 for execution. The attributes based query 332 gets the object schema which should be returned to the application through the shared object access controller 326. The shared object access controller 326 queries the trade permission, gets the attribute list that can be accessed by the application. The shared object access controller 326 returns the object schema associated with the application to the attributes based query 332. The attributes based query 332 queries by request parameter and returns attribute list to SDM shared object DB 316. A shared data format validator 328 validates the format of the values of each attribute. For example, if an attribute in the schema is defined as an integer, the shared data format validator 328 validates whether the value returned for this attribute is an integer. The SDM shared object DB performs regular expression matching, e.g., through the regular expression engine. An SQL query may be performed in the DB, a DB's function may be used to enforce the query condition specified by app 318, which is expressed by attribute based regular expression. The attributes based query 332 returns a response for a read request and the attributes based update 330 returns a response for a write request. The SDM shared object DB 316 returns the data to the attributes based query, which in turn, returns the data to the app.

As described with reference to FIG. 2 and shown at 224, the methodologies of the present disclosure may automate and recommend data sharing configuration among the apps for end users by constructing the data sharing request ("data trades") of apps in a mobile device. In one embodiment of the present disclosure, the data sharing requests may be constructed by employing a data trade dependency graph.

Data sharing configuration scenarios may include discovering the best-matched new application to subscribe to fulfill data requirements; granting or rejecting data trades based on integration optimization rules; discovering any "gap data" for a new application; discovering data trades leading to enable currently disabled functions of an existing application; discovering data trades leading to adding optional functions to a new application; and discovering data trades that cause conflicts.

In one embodiment of the present disclosure, a configuration lookup functionality may be provided in which the data sharing configuration may be identified by using a dependency graph, referred to as Data Trade Dependency Graph, and by downloading only the metadata (data trade information) of apps without actually downloading apps; An app may be downloaded and subscribed only when the configuration determines that the application may be downloaded.

Figure 4:
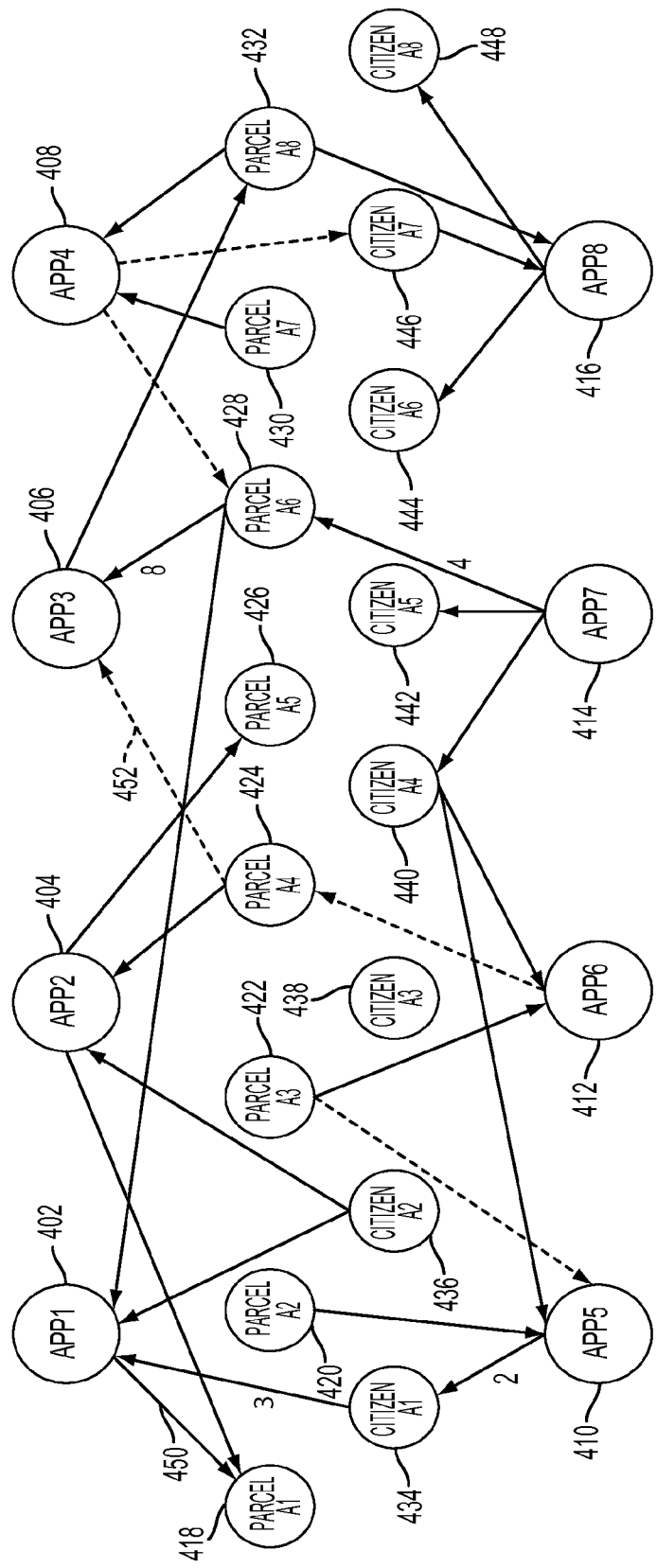
FIG. 4 is a diagram illustrating a data trade dependency graph in one embodiment of the present disclosure.

FIG. 4 is a diagram illustrating a data trade dependency graph in one embodiment of the present disclosure. The dependency graph in one embodiment may include two types of nodes: An application node (402, 404, 406, 408, 410, 412, 414, 416) that represents an app and an attribute node (418, 420, 422, 424, 426, 428, 430, 432, 434, 436, 438, 440, 442, 444, 446, 448) that represents an attribute of a shared object. In one embodiment of the present disclosure, a link exists only between an app type node and an attribute type node, the link representing data trades (offers and requests). In one embodiment of the present disclosure, there are two types of links. One type is granted link that represents a granted data trade. A granted link has a direction which indicates a data flow (request or offer). A grant type link is shown as a solid line (e.g., 450) in FIG. 4. Another type of link is non-granted link that represents a non-granted data trade. A non-granted link also has a direction that indicates that of a request. A non-grant type link is shown as dashed line (e.g., 452) in FIG. 4. A weight may be added to links to express the importance of a data trade for data sharing. For instance, the bigger number represents the higher importance with the default being 1.

The number of two-hop (directional) paths between two app nodes is the number of attributes shared between the apps. A two-hop path means there are only two links on this path. For example, between App3 (406) and App7 (414), there exists one two-hop path, which is App7-ParcelA6-App3. In the example shown in FIG. 4, there is a path between App7 (414) and App4 (408), however, there are four links on this path: App7-Parcel A6-App3-Parcel A8-App4, so it is not a two-hop path. The inbound degree of an attribute node indicates the conflict level which could be caused by the offers of different apps. The inbound degree of a node means the numbers of the inbound links of this node. For example, Parcel A1 (418) has 2 inbound links, so the inbound degree of Parcel A1 (418) is 2. No path between two app nodes means that they are isolated.

Figure 5:
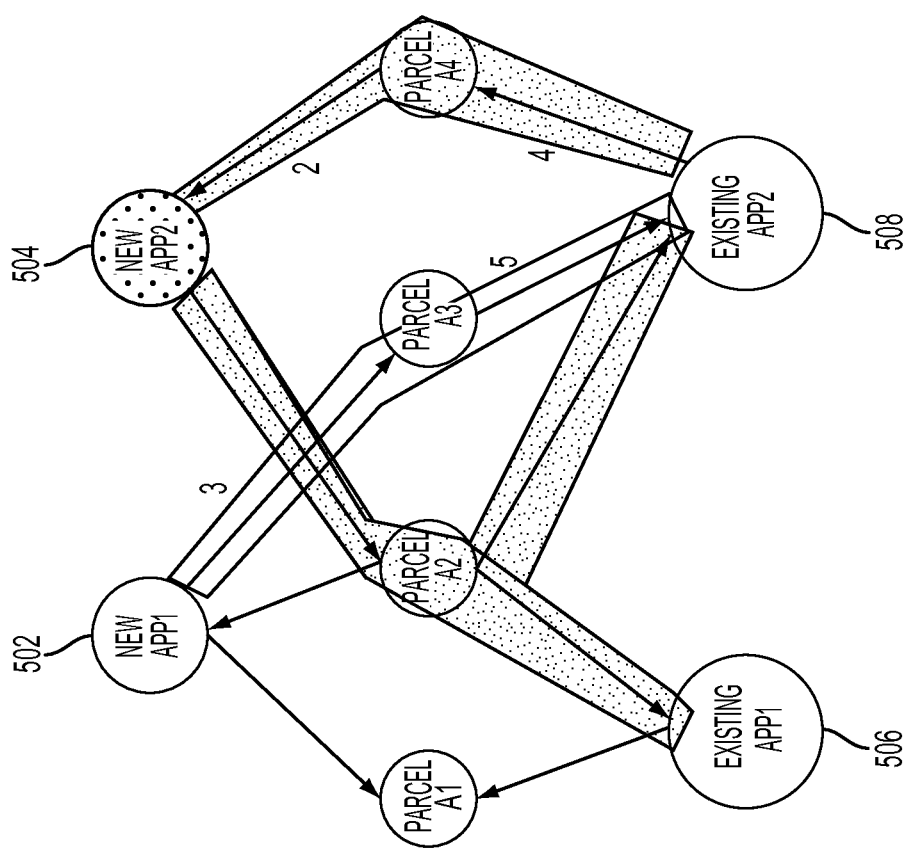
FIG. 5 illustrates data trade dependency graph for finding best matched application to subscribe in one embodiment of the present disclosure.

FIG. 5 illustrates data trade dependency graph for finding best matched application to subscribe in one embodiment of the present disclosure. The best-matching application should be the application which has maximal number of paths between it and the existing applications. This means the best match application will have the maximal number of attributes synced with existing applications. Referring to FIG. 5, the length of two-hop paths between New App2 504 and the existing apps, App1 (506) and App2 (508) is 10, and the length of two-hop paths between New App1 504 and the existing apps 506, 508 is 8; Therefore, the New App2 504 is the best-matching app in this example. The following computation, for instance, may be used to determine the total length of two-hop paths.

The length of two-hop paths between New App2 504 and the existing Apps 506, 508: Between 504 and 508, there is only 1 two-hop path, i.e., Existing App2-Parcel A4-New App2, the length of this path is 4+2=6.

Between 504 and 506, there are 2 two-hop paths, i.e., New App2-Parcel A2-Existing App1 whose length is 1+1=2; New App2-Parcel A2-Existing App2 whose length is also 1+1=2. So the total length between New App2 (504) and the existing apps (506, 508) is 6+2+2=10. Similar computation may be used to determine the total length between New App1 504 and the existing apps 506, 508.

Figure 6:
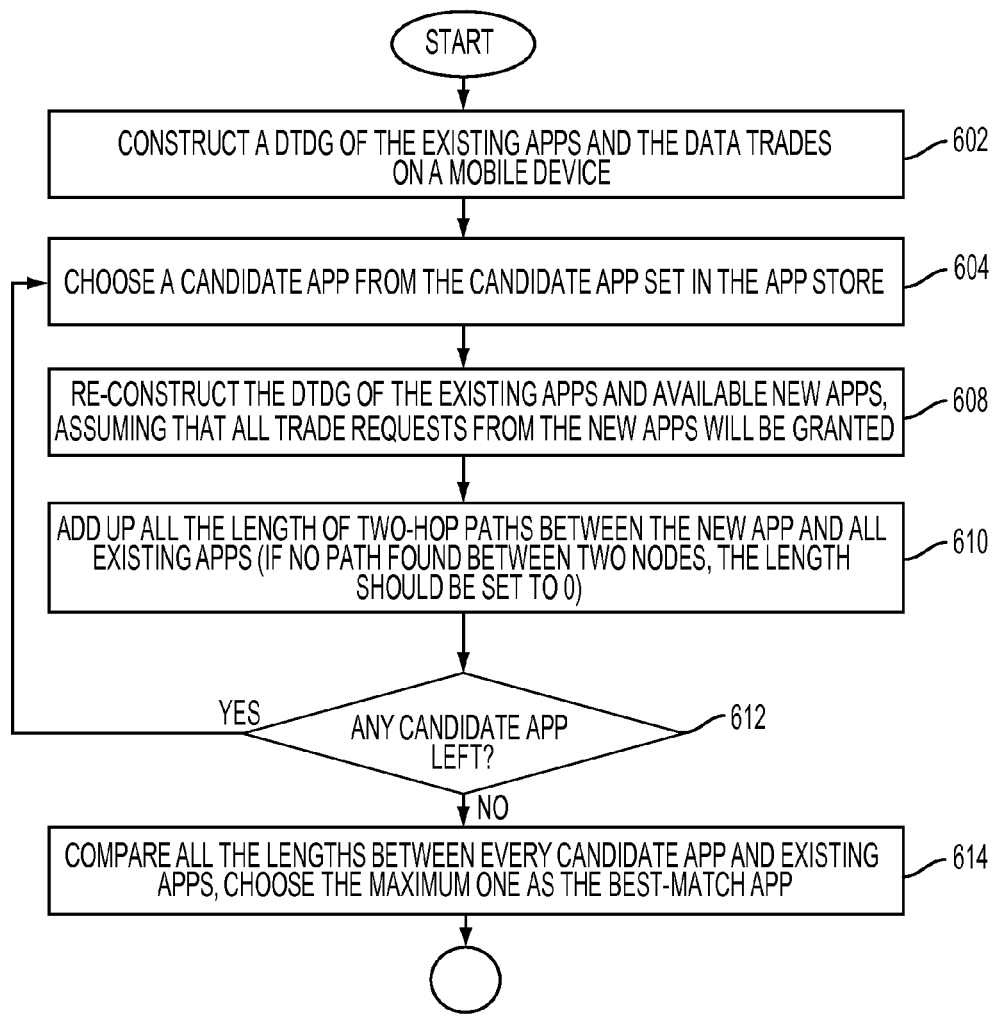
FIG. 6 illustrates a method for finding best matched application to subscribe in one embodiment of the present disclosure.

FIG. 6 illustrates a method for finding best matched application to subscribe in one embodiment of the present disclosure. Candidate apps or applications are those that provide a similar set of functionality and data in an app store, e.g., downloadable to a mobile device from the app store or the like. The best-matched or -matching app is the one having the most number of attributes shared with existing apps on the mobile device. Referring to FIG. 6, at 602, data trade dependency graph is built based on the existing applications on a mobile device and their data trade information. At 604, a candidate application from a candidate application set in an app store is selected. At 608, the data trade dependency graph is re-constructed based on the existing apps and available new apps. In one embodiment of the present disclosure, it is assumed that all trades requests from the new app will be granted. At 610, all the length of two-hop paths between the new app and all existing apps is added. If no path is found between two nodes, the length is 0.

At 612, if there is another candidate app that has not been processed in the candidate application set, the logic repeats the method shown at 604, 606, 608 and 610. At 614, if all candidate apps in the candidate app set have been processed, the lengths between every candidate app and existing apps are compared, and the candidate app having the maximum length is chosen as the best-matched app.

Figure 7:
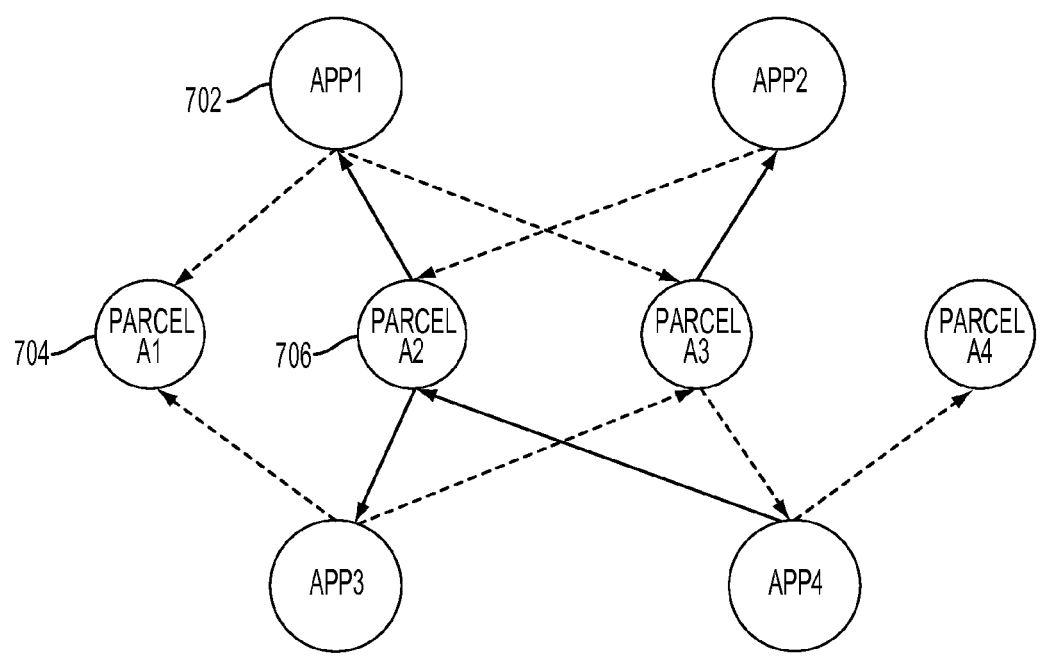
FIG. 7 shows another example of data trade dependency graph.

FIG. 7 shows another example of data trade dependency graph. The data trade dependency graph shows the data access requests that are denied as broken lines connecting the requesting application node (e.g., 702) and the node that represent the data attribute that is requested (e.g., 704). Similarly, the data trade dependency graph shows the data access requests that are granted as solid lines connecting the requesting application node (e.g., 702) and the node that represent the data attribute that is requested (e.g.,. 706).

Figure 8:
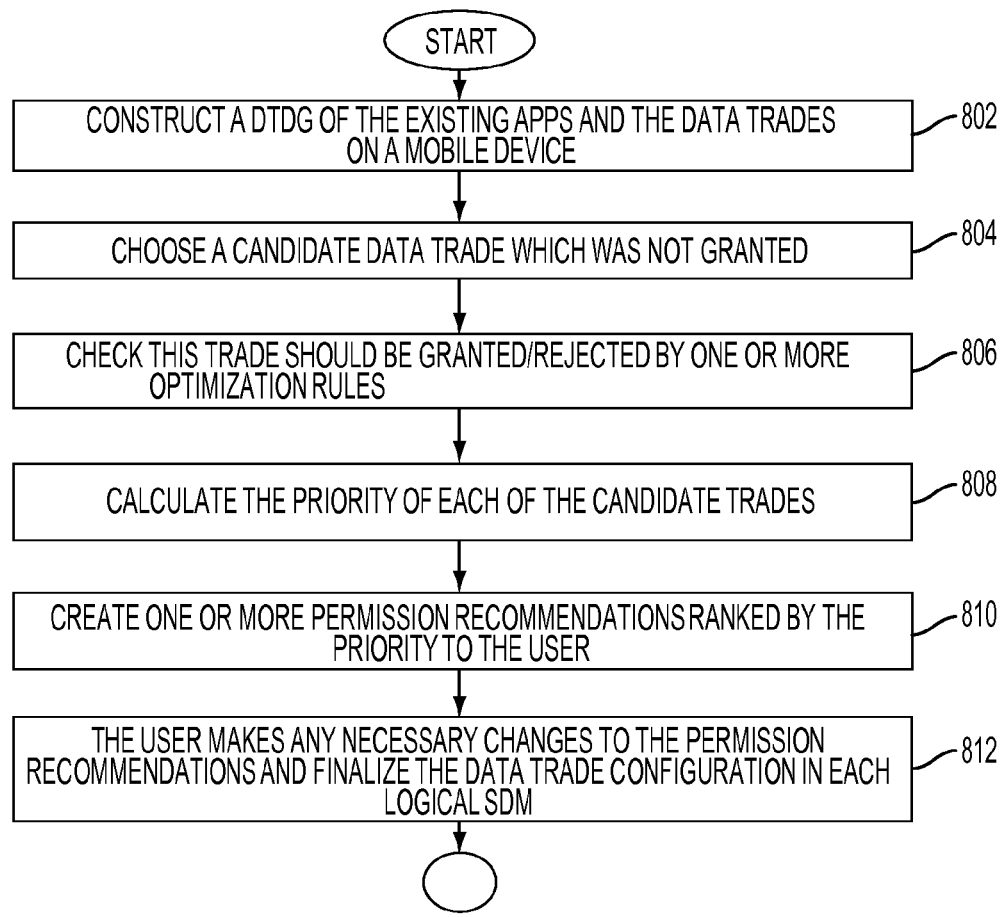
FIG. 8 is a flow diagram illustrating a method for granting and rejecting data trades automatically based on integration optimization rules in one embodiment of the present disclosure.

FIG. 8 is a flow diagram illustrating a method for granting and rejecting data trades automatically based on integration optimization rules in one embodiment of the present disclosure. Data trades (requests or offers) can be either a new data trade coming from a newly subscribed app or an old data trade which have been rejected or not handled previously. A data trade can be evaluated by a set of integration optimization rules, which rules, for example, may include maximizing data sharing among different apps and/or minimizing data conflict between among apps. The weight of links may be used to determine the priority of data trades which should be granted or rejected.

Referring to FIG. 8, at 802, a data trade dependency graph is constructed, for example, as shown in FIG. 7, based on the existing apps and the data trades currently configured among the existing apps on a mobile device. At 804, a candidate data trade which was not granted previously is selected. At 806, one or more optimization rules are employed to check whether the selected candidate data trade should be granted or rejected. Steps 804 and 806 may be repeated for each of the candidate trades. At 808, the priority of each of the candidate trades is calculated. The priority may be decided by the added length (see the tables in FIG. 9 and FIG. 11), the bigger the added length of a candidate trade, the higher priority it has. The absolute number of the priority may be decided in different case, in this example, numerical values 0, 1, 2, 3 are used to indicate the priority.

At 810, one or more permission recommendations are created, e.g., ranked by the priority, for instance, for the user. In this way, the trades that should be granted are recommended along with grant priority. Should not all of the recommended trades be granted, decisions as to which ones should have trade grants may be based on the grant priority. At 812, a user may be enabled to make any necessary changes to the permission recommendations and finalize the data trade configuration in each logical SDM.

Figure 9:
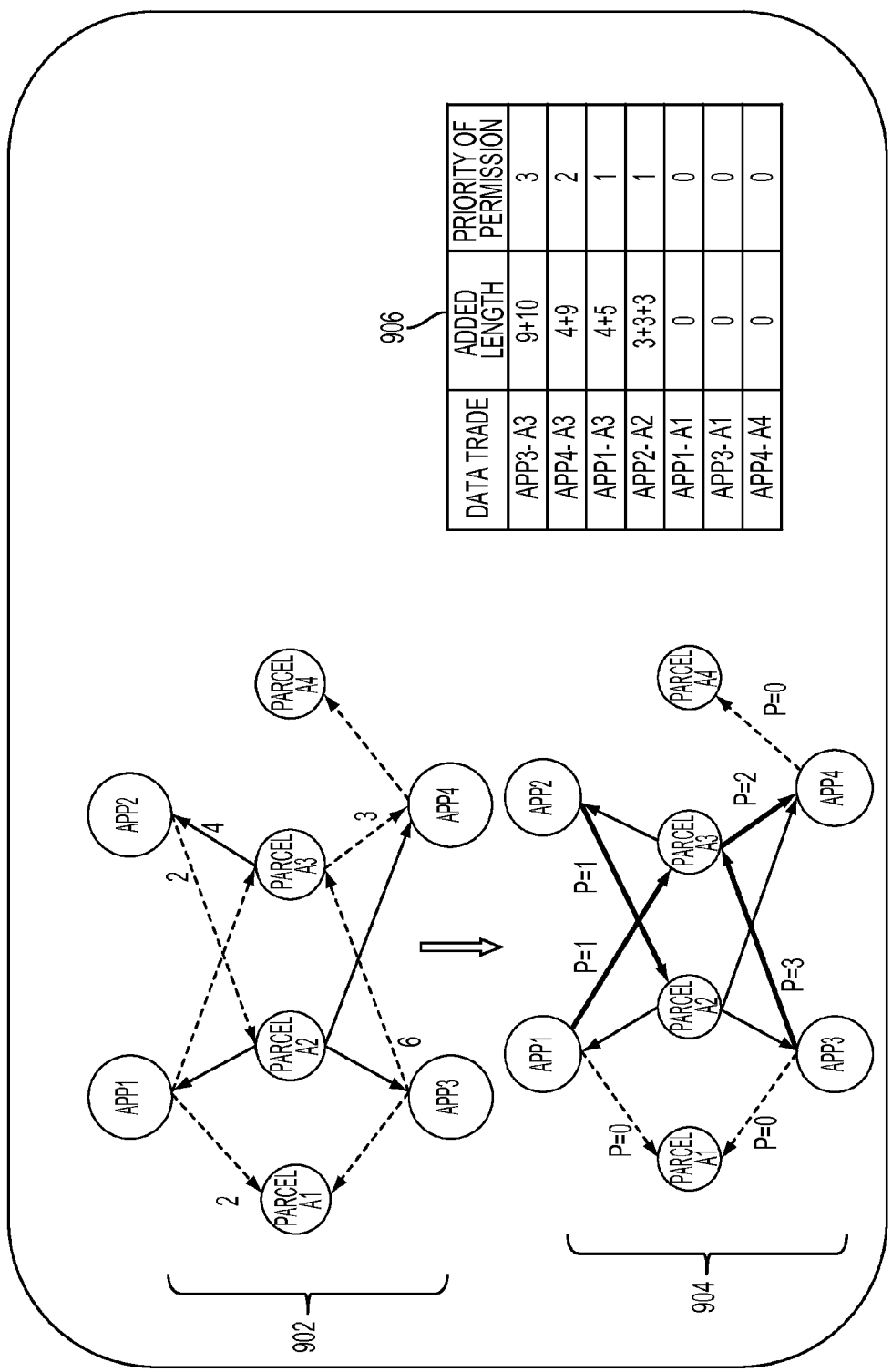
FIG. 9 illustrates data trade dependency graphs in which data trade permissions are recommended based on an optimization rule that maximizes data sharing among different apps in one embodiment of the present disclosure.

FIG. 9 illustrates data trade dependency graphs in which data trade permissions are recommended based on an optimization rule that maximizes data sharing among different apps in one embodiment of the present disclosure. In this embodiment, maximizing data sharing among different apps in one embodiment means to maximize the length of two-hop paths among the app nodes as constructed in the data trade dependency graphs. The graph shown at 902 is an example of a data trade dependency graph used to recommend permissions. The graph shown at 904 illustrates the determined recommendation for data trade that maximizes data sharing.

Figure 10:
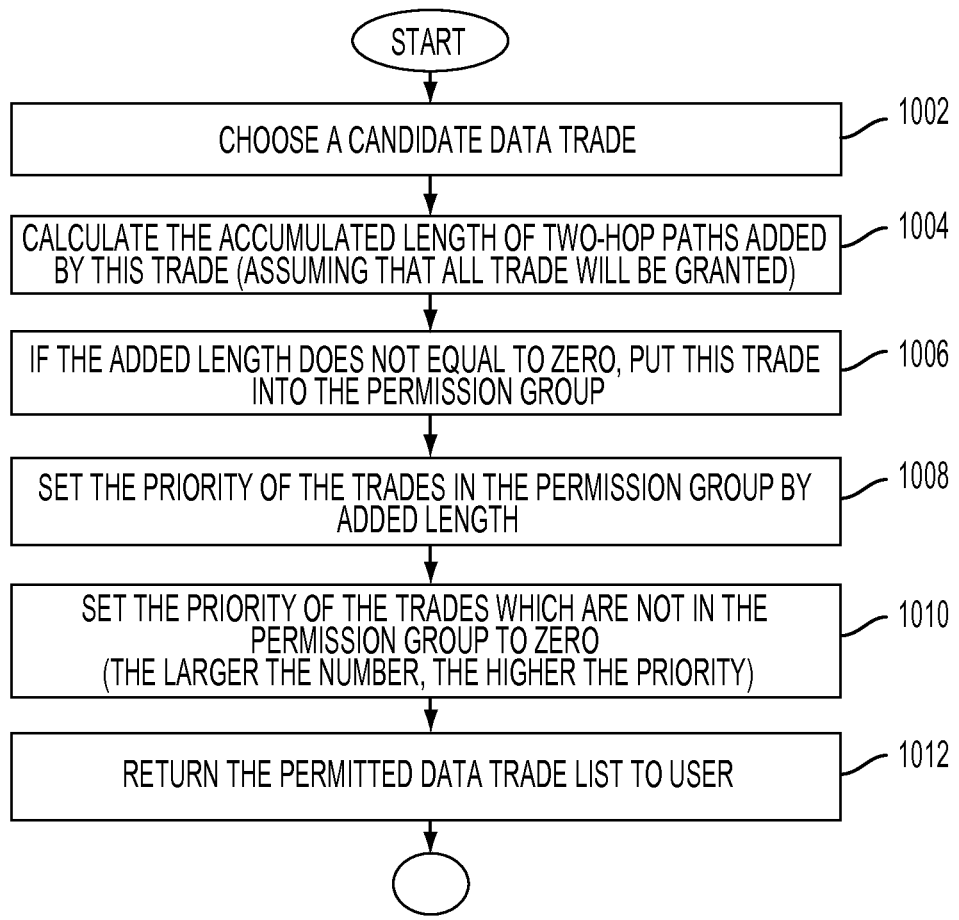
FIG. 10 is a flow diagram that illustrates a method for determining a data trade recommendation based on an optimization rule that maximizes data sharing among different apps in one embodiment of the present disclosure.

FIG. 10 is a flow diagram that illustrates a method for determining a data trade recommendation based on an optimization rule that maximizes data sharing among different apps in one embodiment of the present disclosure. At 1002, a candidate data trade is selected, for example, from a set or list of those data trades that have not been granted previously. For example, as shown in the table at 906 in FIG. 9, an example of candidate data trade is a data trade between App3 and Parcel A3 nodes. At 1004, the accumulated length of two-hop paths added by this trade is computed. In this example, it is assumed that all trade will be granted. For example, in FIG. 9, there are 2 two-hop paths added by the trade, App1-Parcel A3: App1-Parcel A3-App2, the length of this path is 1+4=5; App1-Parcel A3-App4, the length of this path is 1+3=4. Hence the total added length of the trade, App1-Parcel A3, is 5+4=9.

At 1006, if the added length does not equal zero, this data trade is placed into a permission group. The permission group includes one or more trades that should be recommended to the end user as granted trade.

At 1008, the priority of the trade is set in the permission group by added length. Those trades in the permission group are those recommended for granting. The priority may be used by the end user to decide which has higher priority in granting, for instance, in the event that not all of them could be granted.

At 1010, the priority of the trades that are not in the permission group are set to zero. In this example, larger number represents higher priority; However, it should be understood that any other indications are possible to represent different priorities. At 1012, one or more of the determined permitted data trade is returned.

Figure 11:
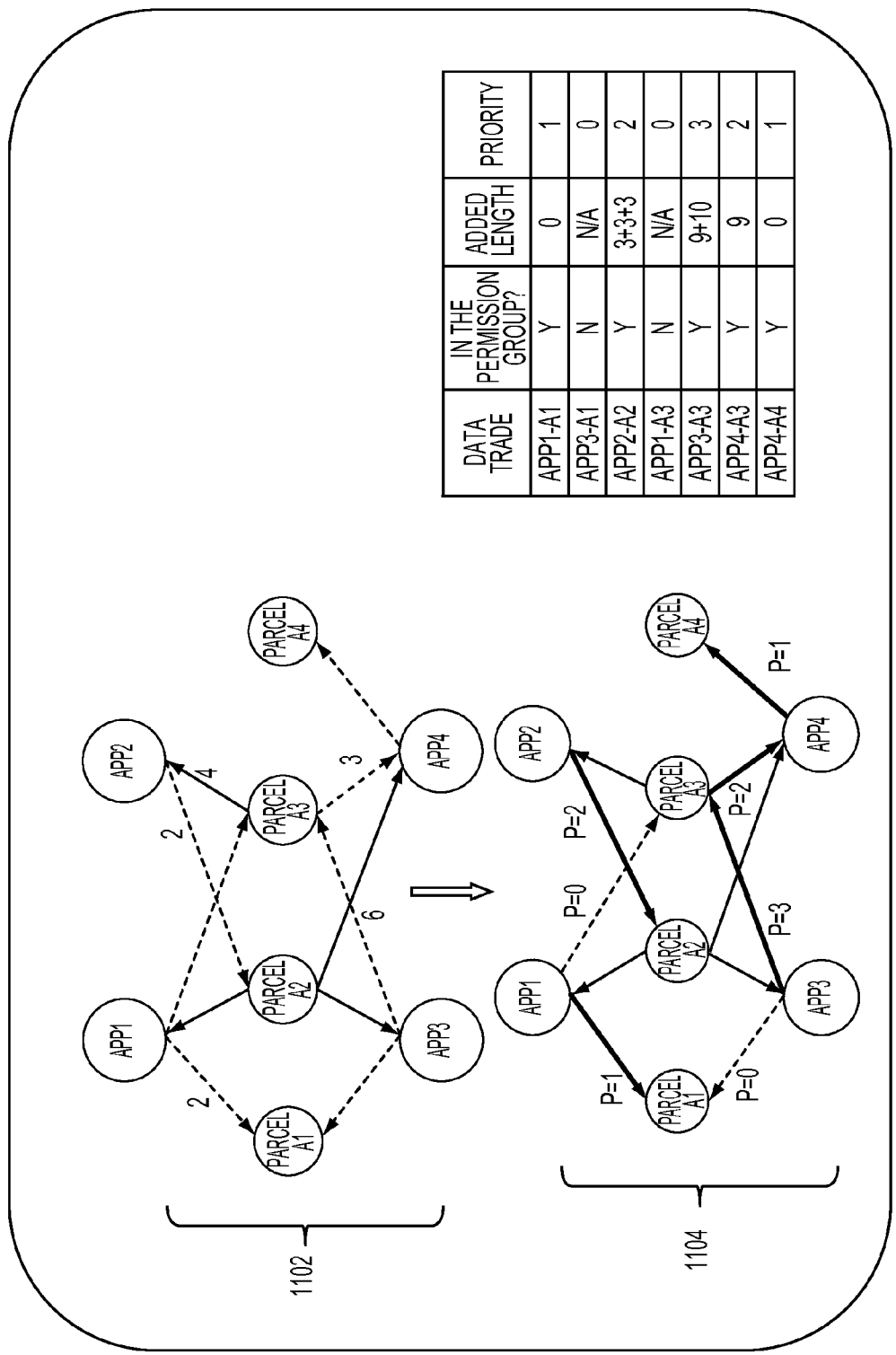
FIG. 11 illustrates data trade dependency graphs in which data trade permissions are recommended based on an optimization rule that minimizes data conflicts among different apps in one embodiment of the present disclosure.

FIG. 11 illustrates data trade dependency graphs in which data trade permissions are recommended based on an optimization rule that minimizes data conflicts among different apps in one embodiment of the present disclosure. In this embodiment, minimizing possible data conflicts among different apps means to minimize the inbound links of attribute nodes which has already one or more inbound links, as represented in a data trade dependency graph. The graph shown at 1102 is an example of a data trade dependency graph used to recommend permissions based on this rule of minimizing possible data conflicts. The graph shown at 1104 illustrates the determined recommendation for data trade that minimizes data conflicts.

Figure 12:
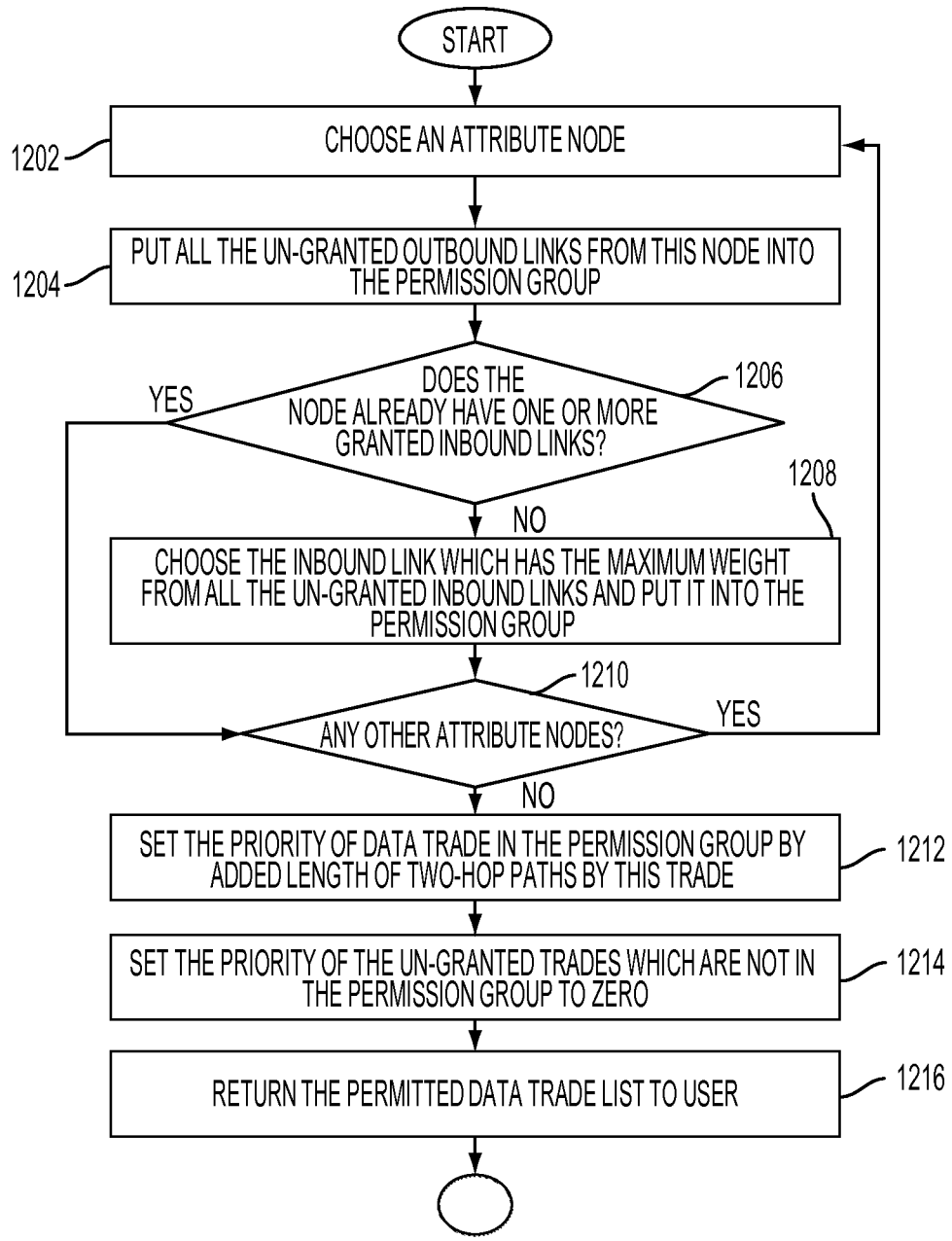
FIG. 12 is a flow diagram that illustrates a method for determining a data trade recommendation based on an optimization rule that minimizes data conflicts among different apps in one embodiment of the present disclosure.

FIG. 12 is a flow diagram that illustrates a method for determining a data trade recommendation based on an optimization rule that minimizes data conflicts among different apps in one embodiment of the present disclosure. At 1202, a node that represents a data attribute is selected from a data trade dependency graph, for example shown in FIG. 11 at 1102. At 1204, all the un-granted outbound links from this node is placed into a permission group. At 1206, it is determined whether the node already has one or more granted inbound links. If so, the logic continues to 1210. If not, at 1208, the inbound link is chosen that has the maximum weight from all the un-granted inbound links and the chosen inbound link is put into the permission group.

At 1210, if there are more attribute nodes to consider from the data trade dependency graph, the steps shown at 1206 and 1208 are repeated for all attribute nodes.

At 1212, a priority of data trade in the permission group is set based on the added length of two-hop paths by this trade. For instance, referring to FIG. 11, there are 2 two-hop paths added by the trade, App3-Parcel A3: App3-Parcel A3-App2, the length of this path is 6+4=10; App3-Parcel A3-App4, the length of this path is 6+3=9. So the total added length of trade App3-Parcel A3 is 10+9=19. In this example, among all the added length of different trades 19 is the highest value; therefore, the trade App3-Parcel A3 is set to have the highest priority, which is 3 in this example.

At 1214, the priority of the un-granted trades that are not in the permission group is set to zero. In this example, larger value represents higher priority; However, it should be understood that any other numerical or other representation may be utilized to indicate priority. At 1216, the permitted data trade list is returned.

Figure 13:
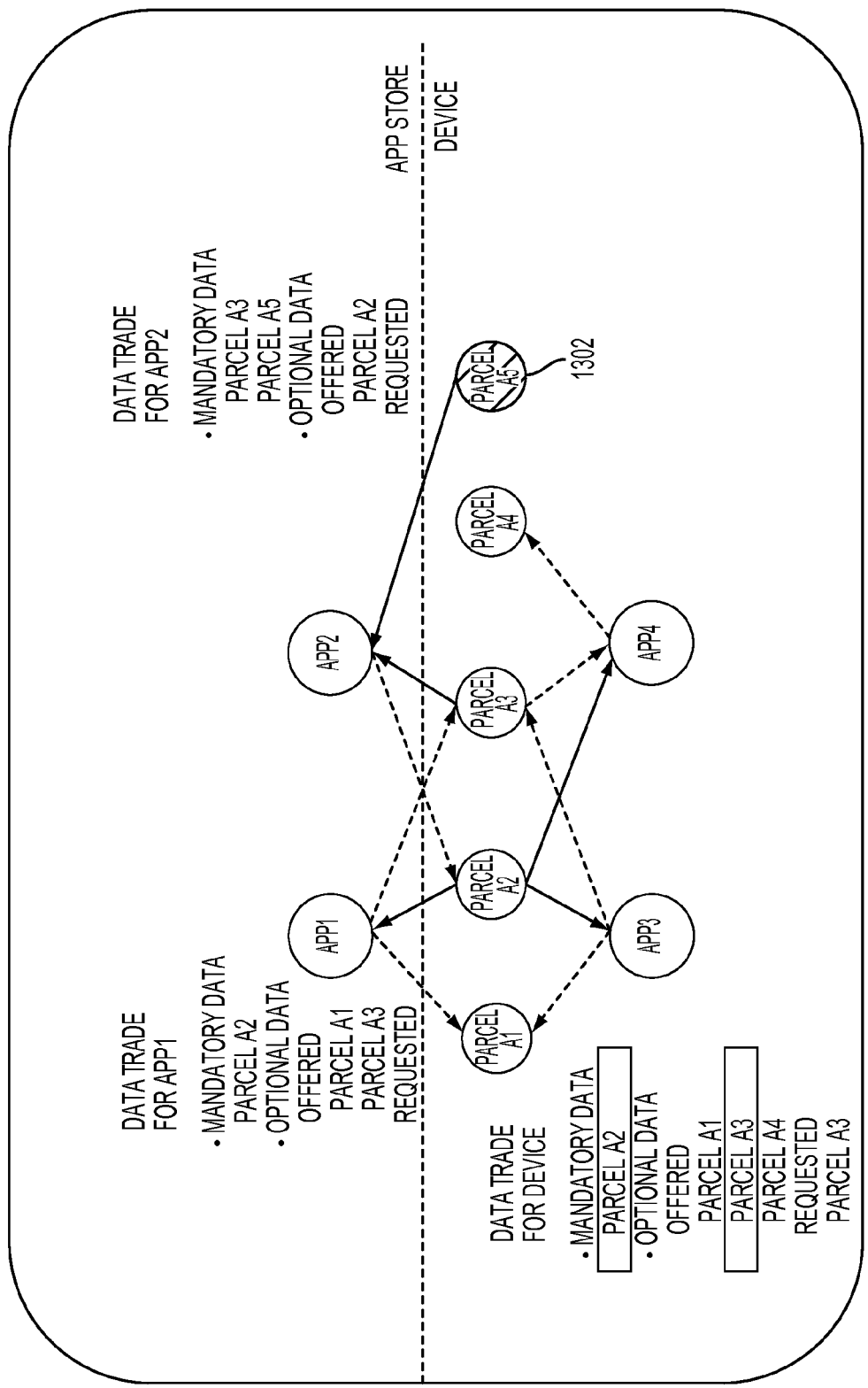
FIG. 13 illustrates dependency graph that shows a method for discovering a "gap data" for a new app in one embodiment of the present disclosure.

FIG. 13 illustrates a dependency graph that shows a method for discovering a "gap data" for a new app in one embodiment of the present disclosure. "Gap data" refers to a data attribute requested by a new app and required to run the app properly (e.g., Parcel A2 by App1, Parcel A3 and Parcel A5 by App2), but not offered by any app. For example, Parcel A5 is needed by App2 but not offered by any apps as shown in the example dependency graph. In the figure, App3 and App4 are existing applications on a mobile device. Data attributes Parcel A1, Parcel A2, Parcel A3 Parcel A4 and Parcel A5 exist on the mobile device, some of which are used and offered by the existing applications. App1 and App2 are candidate applications considered for downloading to the mobile device. In one embodiment of the present disclosure, when adding a new app to the existing data trade dependency graph, it is assumed in one embodiment that all mandatory trades are granted links and that all optional trades are non-granted links. In the new data trade dependency graph, if an attribute node having one or more granted outbound links requested by a new app does not have any inbound link, this attribute is a gap data (e.g., parcel A5 node). In the figure, an outbound arrow from an app node represents an offer for access to the data by that app; an inbound arrow into an app node represents a request to access the data by that app.

Figure 14:
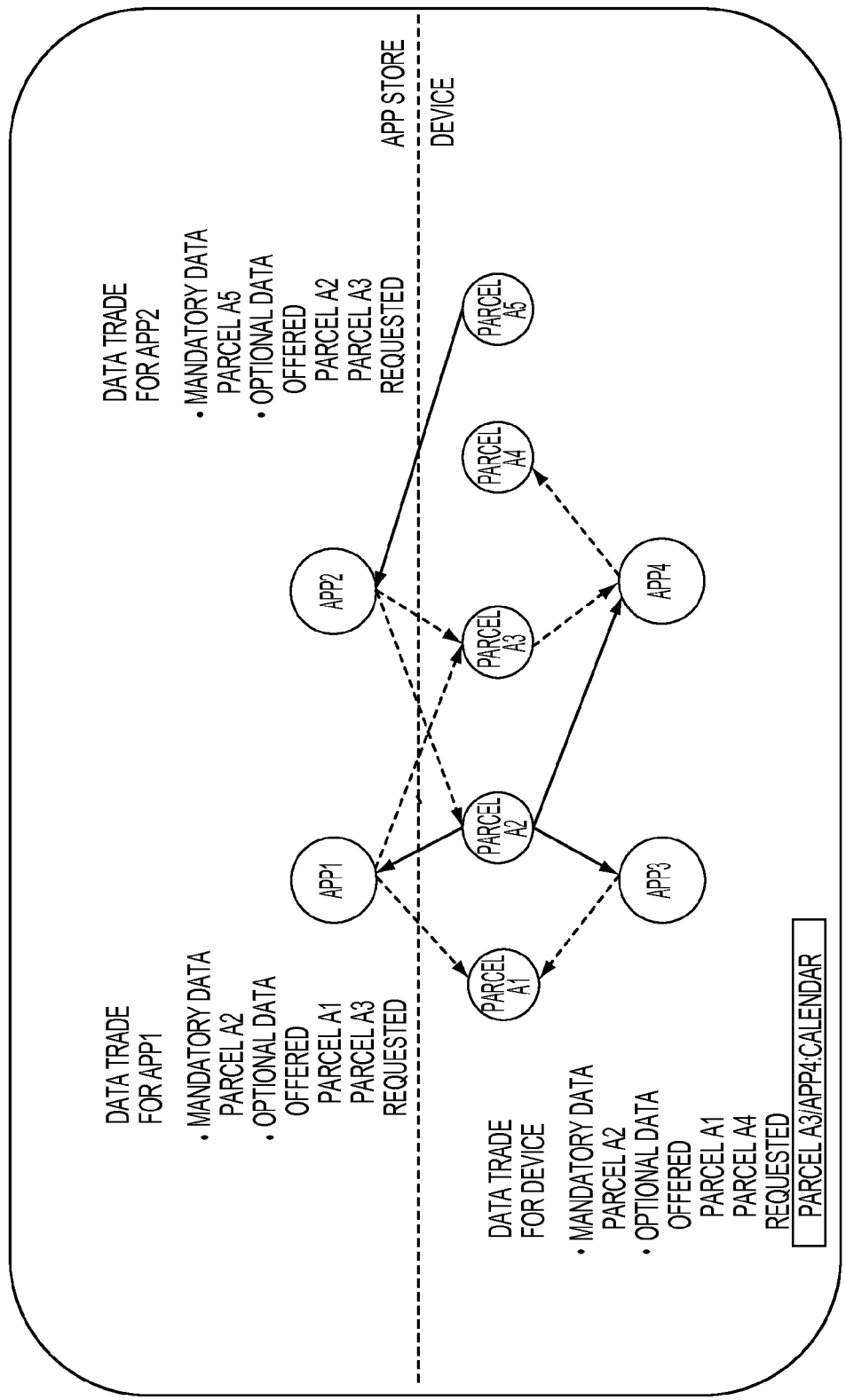
FIG. 14 illustrates a dependency graph that shows a method for discovering data trades leading to enable app functions in one embodiment of the present disclosure.

FIG. 14 illustrates a dependency graph that shows a method for discovering data trades leading to enable app functions in one embodiment of the present disclosure. Any disabled optional functions of already subscribed app (e.g., App4: calendar) can be enabled by subscribing one or more new apps and the data they offer (e.g., Parcel A3 by App1 and/or App2). When adding a new app to the existing data trade dependency graph, it is assumed that all mandatory trades are granted links and that all optional trades are non-granted links. In the data trade dependency graph, if the number of two-hop paths from new apps to existing apps is increased by granting a data trade, this trade can enable one or more currently disabled functions of the existing apps.

Figure 15:
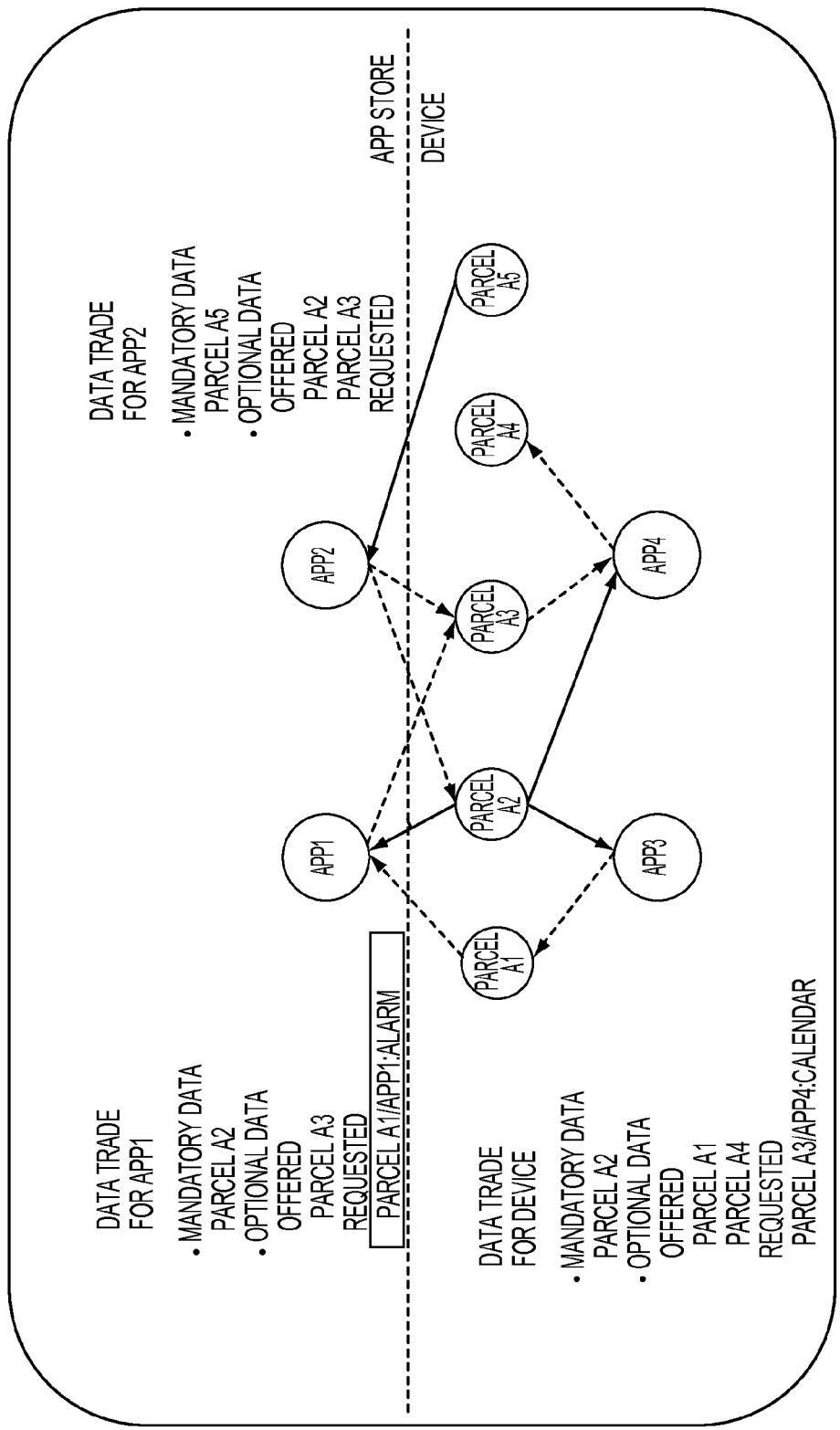
FIG. 15 illustrates a dependency graph that shows a method for discovering data trades leading to add new app functions in one embodiment of the present disclosure.

FIG. 15 illustrates a dependency graph that shows a method for discovering data trades leading to add new app functions in one embodiment of the present disclosure. Any optional functions of a new app (e.g., App1:alarm) can be added by its subscription because its optionally requested data may be offered by an existing app (e.g., Parcel A1 by App3). When adding a new app to the existing data trade dependency graph, it is assumed that all mandatory trades are granted links and that all optional trades are non-granted links. In the data trade dependency graph, if the number of two-hop paths from existing apps to a new app is increased by granting the data trades, these trades can lead to adding one or more (optional) functions to the new app.

Figure 16:
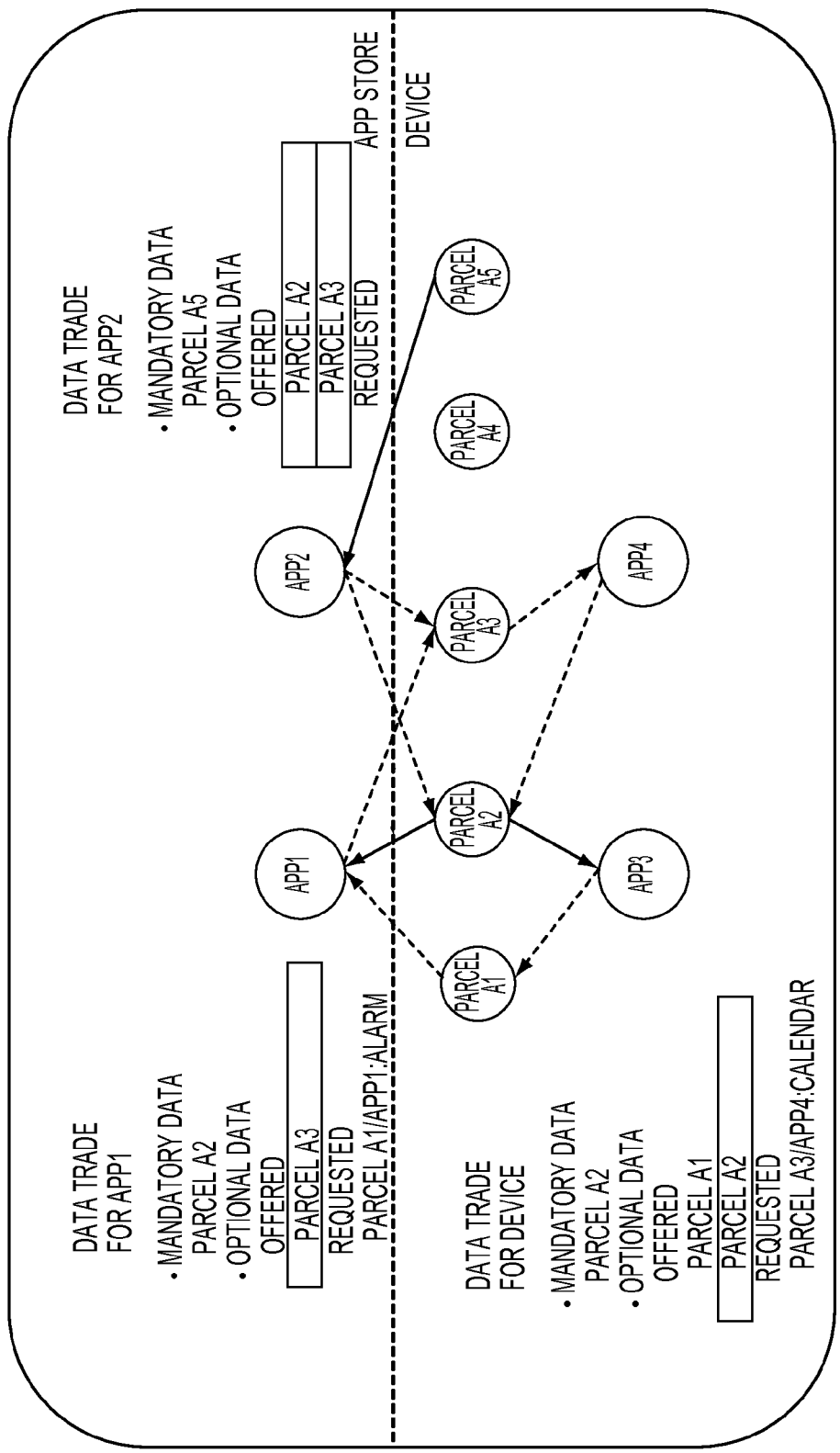
FIG. 16 illustrates a dependency graph that shows a method for discovering data trades which cause conflict in one embodiment of the present disclosure.

FIG. 16 illustrates a dependency graph that shows a method for discovering data trades which cause conflict in one embodiment of the present disclosure. A data attribute offered by more than one app causes a data update conflict. For example, if more than one apps (whether new apps or existing apps) want to write to the same attribute of a data (e.g., offer an attribute), they may write the same data at the same time, which may cause a write conflict if the distributed transaction is not supported. The SDM methodology of the present disclosure in one embodiment determines which (one or both) will be granted a permission to update the data attribute. When adding a new app to the existing data trade dependency graph, it is assumed that all mandatory trades are granted links and that all optional trades are non-granted links. In the data trade dependency graph, if the inbound degree (i.e., the number of inbound links to this node) of an attribute node is more than one, the app offers of this attribute can cause conflicts.

Figure 17:
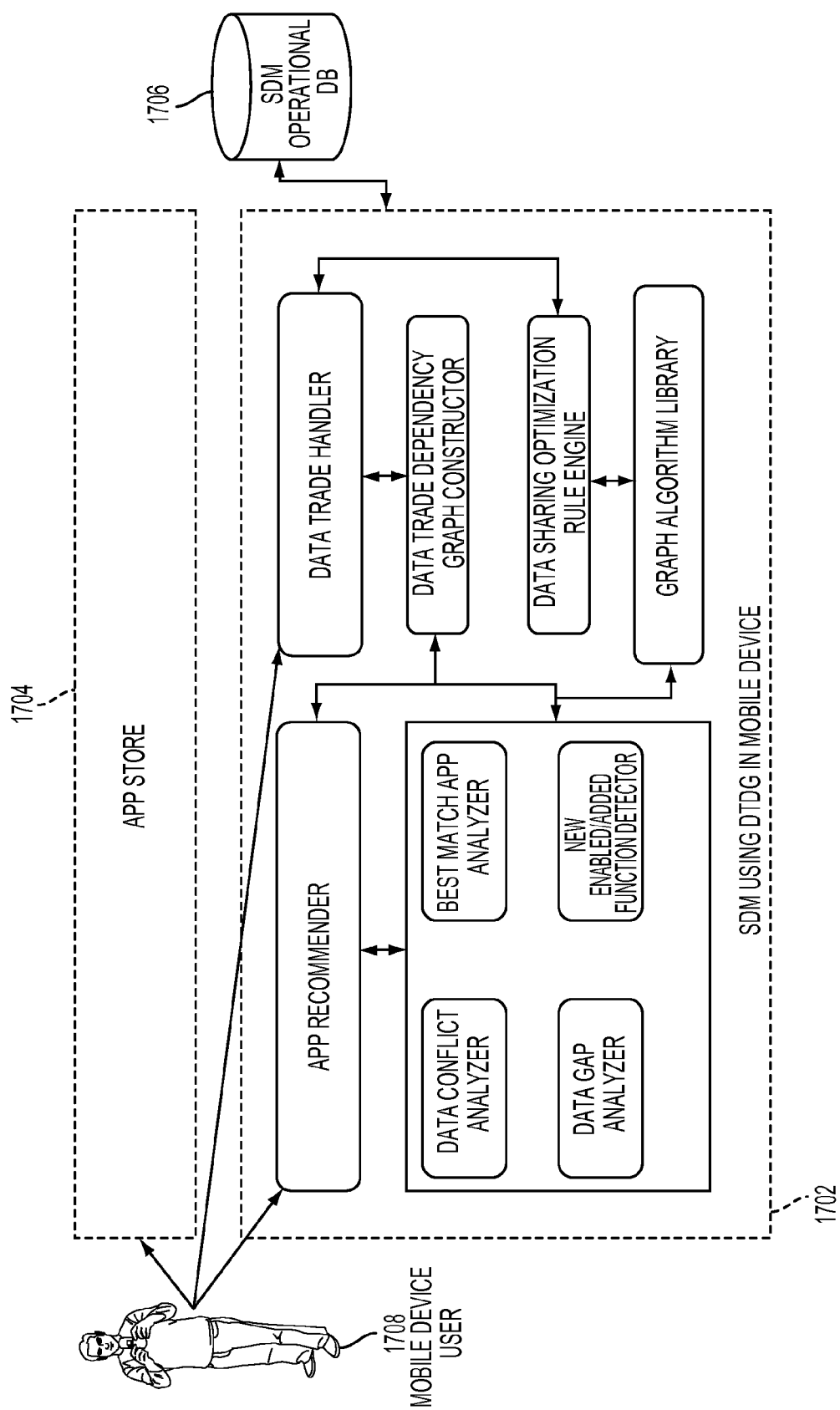
FIG. 17 illustrates components of an SDM system using data trade dependency graphs for app subscription in a mobile device in one embodiment of the present disclosure.

FIG. 17 illustrates components of an SDM system using data trade dependency graphs for app subscription in a mobile device in one embodiment of the present disclosure. One of more components of an SDM system 1702 may execute on a mobile device. The SDM 1702 may communicate with an app store 1704 for downloading applications and data trade information, and also store operational metadata associated with the applications in an SDM operation DB 1706. The SDM 1702 facilitates downloading and use of various mobile device apps for a mobile device user 1708. The functionalities of the components of SDM 1702 are further described with reference to FIGS. 18 and 19 below.

Figure 18:
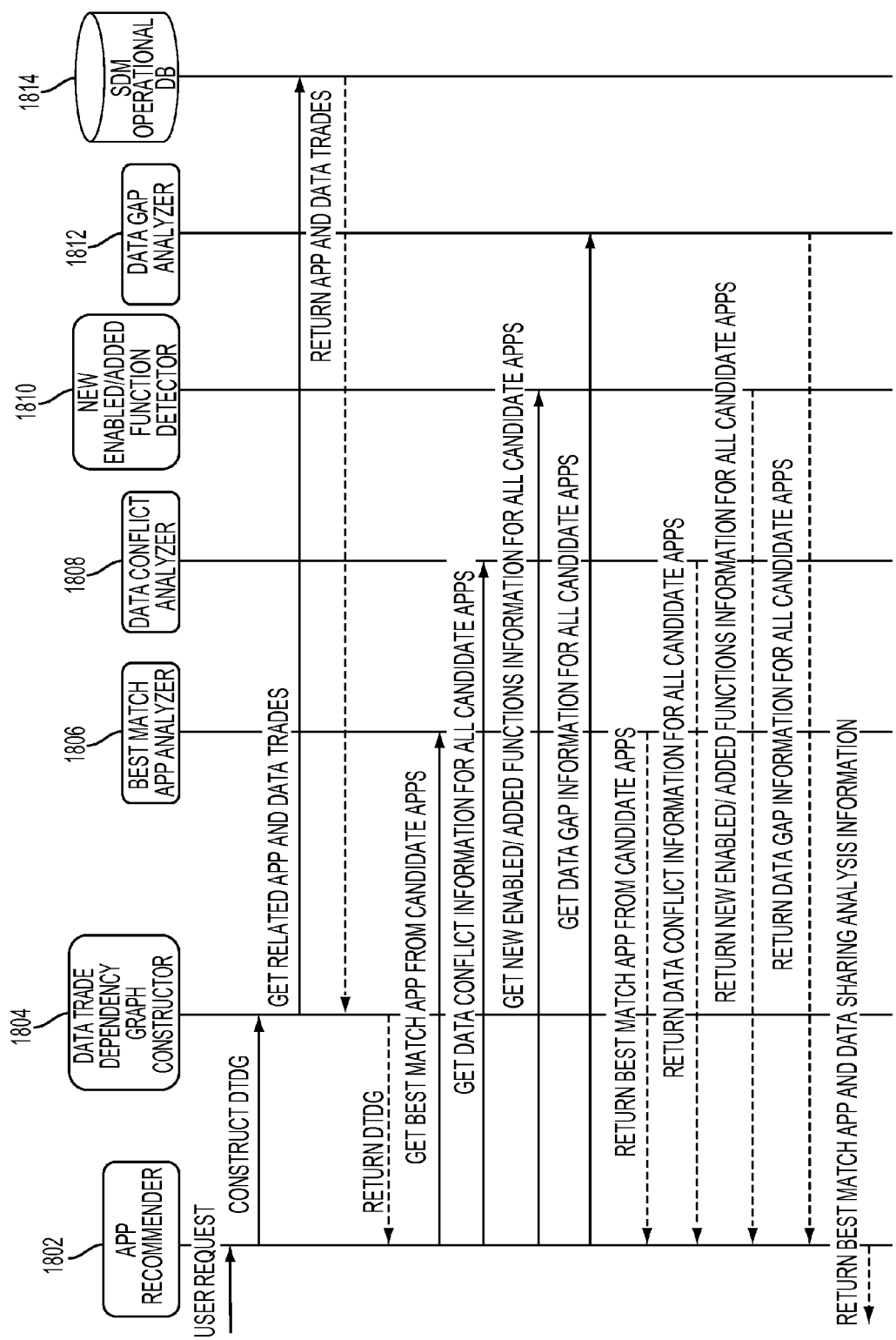
FIG. 18 illustrates SDM functionalities in one embodiment of the present disclosure in recommending an application to download to a mobile device.

FIG. 18 illustrates SDM functionalities in one embodiment of the present disclosure in recommending an application to download to a mobile device. An app recommender component 1802 receives a user request to recommend an application to download to a mobile device. In response, the app recommender 1802 invokes a data trade dependency graph constructor component 1804 to construct a data trade dependency graph of existing applications and data that those applications are using and offering. The data trade dependency graph constructor 1804 retrieves related applications and data trade information from an SDM operational DB 1814. The related applications refer to all existing applications that are using the SDM system (1702) in this device. The data trade dependency graph constructor 1804 builds a data trade dependency graph based on the retrieved information.

Based on the constructed data trade dependency graph, the app recommender 1802 may determine the best matching application from candidate set of applications to be downloaded, for example, by invoking a best match app analyzer component 1806 (e.g., described in detail with reference to FIGS. 9-12). Similarly, based on the constructed data trade dependency graph, the app recommender 1802 may determine data conflict information for all candidate applications to be downloaded, for example, by invoking a data conflict analyzer component 1808 (e.g., described in detail with reference to FIG. 16). Likewise, based on the constructed data trade dependency graph, the app recommender 1802 may determine one or more newly enabled or added functions, for example, by invoking a new enabled/added function detector component 1810 (e.g., described in detail with reference to FIG. 14 and FIG. 15). The app recommender 1802 may also determine data gap information for all candidate application to be downloaded to the mobile device, for example, by invoking a data gap analyzer component 1812 (e.g., described in detail with reference to FIG. 13). The app recommender 1802 may return the determined information associated with best matching application and data gap information to a user.

Figure 19:
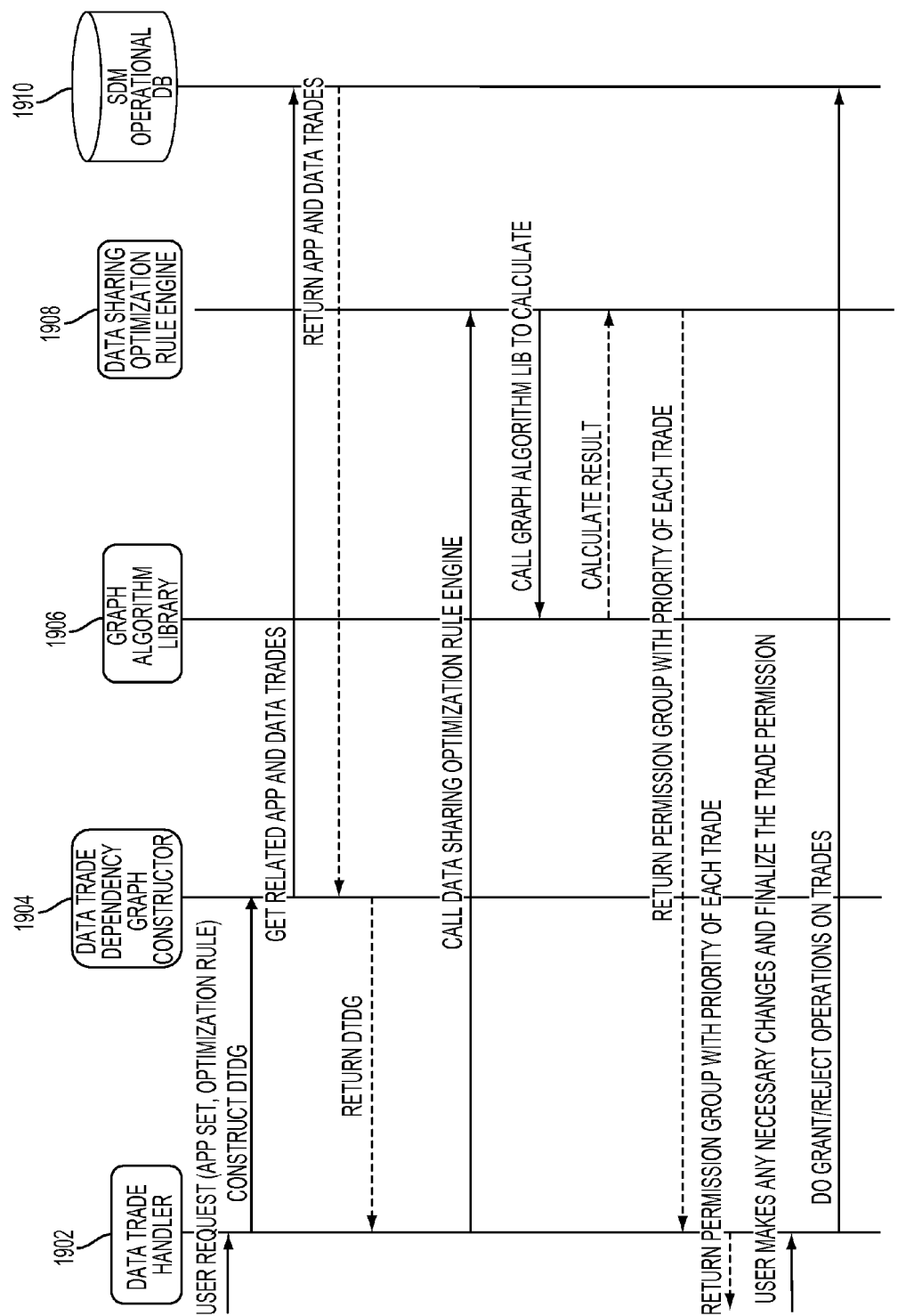
FIG. 19 illustrates SDM functionalities in one embodiment of the present disclosure for data trade handling for applications for a mobile device.

FIG. 19 illustrates SDM functionalities in one embodiment of the present disclosure for data trade handling for applications for a mobile device. A data trade handler component 1902 may receive a user request for data trade, including a set of applications involved in the requested data trade and an optimization rule that is to be employed in the requested data trade. In response the data trade handler 1902 may invoke a data trade dependency graph constructor component 1904 to construct a data trade dependency graph of existing applications and data that those applications are using and offering. The data trade dependency graph constructor 1904 retrieves related applications and data trade information from an SDM operational DB 1910 and builds a data trade dependency graph based on the retrieved information. Using the constructed data trade dependency graph, the data trade handler 1902 invokes a data sharing optimization rule engine component 1908. The data sharing optimization rule engine 1908 invokes a graph algorithm library component 1906 to compute the length of all the new two-hop paths created by each data trade. Based on the computed result the data sharing optimization rule engine returns to the data trade handler 1902 the determined permission group with priority of each trade. The data trade handler 1902 returns the permission group with priority of each trade. The permission group includes one or more trades that are to be recommended to the end user as granted trade. A user may be enabled to make any desired changes and modify or confirm the trade permission. The data trade handler 1902 performs the data trade permission (grant to data access, denial or rejection of data access) and stores the permission information in the SDM operational DB 1910.

A mobile device of the present disclosure in one aspect may be a smart phone or like device and may include a computer or processing system, including computer system executable instructions, such as program modules, being executed by a computer system. Generally, program modules may include routines, programs, objects, components, logic, data structures, and so on that perform particular tasks or implement particular abstract data types. Parts of the computer system may be practiced in distributed cloud computing environments where tasks are performed by remote processing devices that are linked through a communications network. In a distributed cloud computing environment, program modules may be located in both local and remote computer system storage media including memory storage devices.

The components of mobile device may include, but are not limited to, one or more processors or processing units, a system memory, and a bus that couples various system components including system memory to processor. The processor may include one or more modules that perform the methods described herein. The modules may be programmed into the integrated circuits of the processor, or loaded from memory, storage device, or network or combinations thereof.

Bus may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory can include computer system readable media in the form of volatile memory, such as random access memory (RAM) and/or cache memory or others. Computer system may further include other removable/non-removable, volatile/non-volatile computer system storage media. Each can be connected to bus by one or more data media interfaces.

Computer system may also communicate with one or more devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces.

Still yet, computer system can communicate with one or more networks such as a local area network (LAN), a general wide area network (WAN), and/or a public network (e.g., the Internet) via network adapter. A network adapter may communicate with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of coordinating data sharing among applications in a mobile device, comprising:
constructing, by a processor, a data trade dependency graph based at least on one or more mobile applications existing on the mobile device and data trade information associated with the mobile applications, the data trade dependency graph including one or more application nodes representing the one or more mobile applications respectively, and one or more data attribute nodes that represent one or more data attributes associated with the one or more mobile applications;
determining a best-matching candidate application to deploy to the mobile device from a set of candidate applications based on the data trade dependency graph;
determining data conflict information for all of the candidate applications based on the data trade dependency graph;
determining newly enabled and added function information for all candidate applications;
determining data gap information for all candidate applications; and
presenting the best-matching candidate application and data sharing analysis information gathered from the determined data conflict information, the determined newly enabled and added function information, and the determined data gap information.

2. The method of claim 1, further including enabling a user to modify the determined best-matching candidate application, the determined data conflict information, the determined newly enabled and added function information, and the determined data gap information.

3. The method of claim 1, wherein the determining a best-matching candidate application to deploy to the mobile device comprises:
selecting a candidate application from the set of candidate applications;
reconstructing the data trade dependency graph to further include the selected candidate application;
accumulating all length of two-hop paths between the selected candidate application and all of the existing mobile applications in the reconstructed data trade dependency graph;
repeating the selecting, reconstructing and accumulating for another candidate application from the set of candidate applications until all of the candidate applications in the set are selected;
comparing the accumulated length of all of the candidate applications; and
choosing the candidate application with largest accumulated length as the best-matching candidate application.

4. The method of claim 1, wherein the determining data conflict information comprises:
selecting a data attribute node from said one or more data attribute nodes in the data trade dependency graph;
determining whether two or more applications have write access to data represented by the selected data attribute node, and it is determined that two or more applications have write access to data represented by the selected data attribute node, identifying a conflict.

5. The method of claim 1, wherein the determining newly enabled and added function information comprises:
identifying granted data trade previously ungranted based on the data trade dependency graph;
identifying a disabled function in said one or more mobile applications that uses the identified granted data trade, wherein the identified disabled function can be enabled; and
identifying an addable function to said one or more mobile applications that uses the identified granted data trade.

6. The method of claim 1, wherein the determining data gap information comprises:
adding one or more new application nodes to the data trade dependency graph;
adding one or more links between the one or more new application nodes and the one or more data attribute nodes that the one or more new applications use;
determining whether the one or more data attribute nodes that the one or more new applications use are offered by said one or more mobile applications; and
in response to determining that the one or more data attribute nodes that the one or more new applications use are not offered by said one or more mobile applications, identifying a data gap.

7. A method of coordinating data sharing among applications in a mobile device, comprising:
constructing, by a processor, a data trade dependency graph based at least on one or more mobile applications existing on the mobile device and data trade information associated with the mobile applications, the data trade dependency graph including one or more application nodes representing the one or more mobile applications respectively, and one or more data attribute nodes that represent one or more data attributes associated with the one or more mobile applications;
selecting a candidate data trade that is un-granted from the data trade dependency graph;
selecting an optimization rule to apply;
evaluating whether to grant data trade to the candidate data trade based on the selected optimization rule;
computing a priority for each of the evaluated candidate data trade considered for granting; and
generating a permission recommendation ranked by the priority,
wherein data trade permissions are automatically determined.

8. The method of claim 7, further comprising:
enabling a user to manually modify the permission recommendation.

9. The method of claim 7, wherein the selected optimization rule comprises maximizing data sharing rule and the evaluating comprises:
computing an accumulated length of two-hop paths added by the selected candidate data trade;
placing the selected candidate data trade into a permission group if the accumulated length is not zero;
setting a priority of trades in the permission group by the accumulated length;
setting the priority of trades not in the permission group to zero; and
returning the trades in the permission group.

10. The method of claim 7, wherein the selected optimization rule comprises minimizing data conflicts rule and the evaluating comprises:
placing all ungranted outbound links from the node representing the selected data trade into a permission group;
determining whether the node has one or more granted inbound links;
if the node does not have one or more granted inbound links, selecting an inbound link that has maximum weight from all un-granted inbound links and placing the selected inbound link in the permission group;

repeating the determining, selecting and placing for all of the data attribute nodes;

setting priority of data trade in the permission group by added length of two-hop paths by the data trade;

setting priority of un-granted trades that are not in the permission group; and retuning one or more data trades in the permission group.

11. The method of claim 7, wherein the data trade permissions are for newly subscribed applications.

12. The method of claim 7, wherein the data trade permissions are for the existing mobile applications.

13. A non-transitory computer readable storage medium storing a program of instructions executable by a machine to perform a method of coordinating data sharing among applications in mobile devices, comprising:

constructing, by a processor, a data trade dependency graph based at least on one or more mobile applications existing on the mobile device and data trade information associated with the mobile applications, the data trade dependency graph including one or more application nodes representing the one or more mobile applications respectively, and one or more data attribute nodes that represent one or more data attributes associated with the one or more mobile applications;

determining a best-matching candidate application to deploy to the mobile device from a set of candidate applications based on the data trade dependency graph;

determining data conflict information for all of the candidate applications based on the data trade dependency graph;

determining newly enabled and added function information for all candidate applications;

determining data gap information for all candidate applications; and presenting the best-matching candidate application and data sharing analysis information gathered from the determined data conflict information, the determined newly enabled and added function information, and the determined data gap information.

14. The non-transitory computer readable storage medium of claim 13, further including enabling a user to modify the determined best-matching candidate application, the determined data conflict information, the determined newly enabled and added function information, and the determined data gap information.

15. The non-transitory computer readable storage medium of claim 13, wherein the determining a best-matching candidate application to deploy to the mobile device comprises:

selecting a candidate application from the set of candidate applications;

reconstructing the data trade dependency graph to further include the selected candidate application;

accumulating all length of two-hop paths between the selected candidate application and all of the existing mobile applications in the reconstructed data trade dependency graph;

repeating the selecting, reconstructing and accumulating for another candidate application from the set of candidate applications until all of the candidate applications in the set are selected;

comparing the accumulated length of all of the candidate applications; and choosing the candidate application with largest accumulated length as the best-matching candidate application.

16. The non-transitory computer readable storage medium of claim 13, wherein the determining data conflict information comprises:

selecting a data attribute node from said one or more data attribute nodes in the data trade dependency graph;

determining whether two or more applications have write access to data represented by the selected data attribute node, and it is determined that two or more applications have write access to data represented by the selected data attribute node, identifying a conflict.

17. The non-transitory computer readable storage medium of claim 13, wherein the determining newly enabled and added function information comprises:

identifying granted data trade previously ungranted based on the data trade dependency graph;

identifying a disabled function in said one or more mobile applications that uses the identified granted data trade, wherein the identified disabled function can be enabled; and identifying an addable function to said one or more mobile applications that uses the identified granted data trade.

18. The non-transitory computer readable storage medium of claim 13, wherein the determining data gap information comprises:

adding one or more new application nodes to the data trade dependency graph;

adding one or more links between the one or more new application nodes and the one or more data attribute nodes that the one or more new applications use;

determining whether the one or more data attribute nodes that the one or more new applications use are offered by said one or more mobile applications; and in response to determining that the one or more data attribute nodes that the one or more new applications use are not offered by said one or more mobile applications, identifying a data gap.

19. A system for coordinating data sharing among applications, comprising:

a mobile device having a processor;

a shared data manager module deployed on the mobile device and operable to execute on the processor, the shared data manager comprising:

a data trade dependency graph constructor operable to construct a data trade dependency graph based at least on one or more mobile applications existing on the mobile device and data trade information associated with the mobile applications, the data trade dependency graph including one or more application nodes representing the one or more mobile applications respectively, and one or more data attribute nodes that represent one or more data attributes associated with the one or more mobile applications;

a best-match app analyzer operable to determine a best-matching candidate application to deploy to the mobile device from a set of candidate applications based on the data trade dependency graph;

a data conflict analyzer operable to determine data conflict information for all of the candidate applications based on the data trade dependency graph;

a new enabled and added function detector operable to determine newly enabled and added function information for all candidate applications;

a data gap analyzer operable to determine data gap information for all candidate applications; and an app recommender operable to invoke the best-match app analyzer, the data conflict analyzer, the new enabled and added function detector, and the data gap analyzer, the app recommender further operable to present the best-matching candidate application and data sharing analysis information gathered from the determined data conflict information, the determined newly enabled and added function information, and the determined data gap information.

20. The system of claim 19, wherein the shared data manager is further operable to enable a user to manually modify the best-matching candidate application and data sharing analysis information.

21. The system of claim 19, wherein the shared data manager further comprises:
a data trade handler operable to select a candidate data trade that is un-granted from the data trade dependency graph;
a data sharing optimization rule engine operable to apply a selected optimization rule and evaluate whether to grant data trade to the candidate data trade based on the selected optimization rule;
a graph algorithm library module operable to compute a priority for each of the evaluated candidate data trade considered for granting;
the data sharing optimization rule engine further operable to generate a permission recommendation ranked by the priority;
the data trade handler further operable to present the permission recommendation.

22. The system of claim 19, further including and a shared data manager operational database operable to store information associated with a plurality of mobile applications, wherein the data trade dependency graph constructor is further operable to retrieve the information for constructing the data trade dependency graph.

* * * * *